(12) United States Patent
Guyan et al.

(10) Patent No.: US 9,305,316 B2
(45) Date of Patent: Apr. 5, 2016

(54) BEHAVIOR SETS METHOD AND SYSTEM

(75) Inventors: George Victor Guyan, White Stone, VA (US); Carrie Catherine Lonze, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 598 days.

(21) Appl. No.: 13/473,333

(22) Filed: May 16, 2012

(65) Prior Publication Data

US 2012/0296858 A1 Nov. 22, 2012

Related U.S. Application Data

(60) Provisional application No. 61/488,494, filed on May 20, 2011.

(51) Int. Cl.
G06N 5/02 (2006.01)
G06Q 40/08 (2012.01)

(52) U.S. Cl.
CPC . *G06Q 40/08* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 7,356,460 B1* | 4/2008 | Kennedy et al. | 704/9 |
| 2002/0035488 A1* | 3/2002 | Aquila et al. | 705/4 |
| 2010/0211412 A1* | 8/2010 | Tholl et al. | 705/4 |
| 2011/0289424 A1* | 11/2011 | Rovik et al. | 715/744 |

* cited by examiner

*Primary Examiner* — Kakali Chaki
*Assistant Examiner* — Michael Zidanic
(74) *Attorney, Agent, or Firm* — Brinks Gilson & Lione

(57) ABSTRACT

A behavior sets system facilitates the dynamic generation of field and rule behavior sets for an insurance policy and claims processing computer system. The behavior sets system includes various modules and graphical user interfaces that provide a streamlined mechanism for creating new behavior sets of field and rule behaviors for the insurance processing architecture. The behavior sets system may include various levels of usability that distinguish between an advanced user of the behavior sets system and basic user that uses the generated field and rule behavior sets. The behavior sets system may also include graphical user interfaces directed to adding, editing, removing, or maintaining the behavior of fields and rules for the insurance policy and claims processing computer system.

59 Claims, 32 Drawing Sheets

Field: Bodily Injury (BI) Limits of Liability

*Behavior Set 1:* Basic behavior for the majority of scenarios

Scope:
- State: All
- Channel: All
- Transaction: All

Behavior(s):
1) Required: Yes
2) Visible: Yes
3) Default: 50,000
4) Valid values: 50,000, 100,000, 200,000

*Behavior Set 2:* Exception behavior for the state of IL (default value and valid values are different)

Scope:
- State: IL
- Channel: All
- Transaction: All

Behavior(s):
1) Required: Yes
2) Visible: Yes
3) Default: 100,000
4) Valid values: 100,000, 200,000

FIG. 4

Rule: UM limits must equal UIM limits

*Behavior Set 1:* Basic behavior for the majority of scenarios

Trigger:
- Save Coverage Details

Scope:
- State: All
- Channel: All
- Transaction: All

Behavior(s):
- Hard Edit / Stop: A hard edit error message is displayed: "UM limits must equal UIM limits before issuing the policy." User must satisfy the rule to continue.

*Behavior Set 2:* Exception behavior for a Quote transaction (different behavior)

Trigger:
- Save Coverage Details

Scope:
- State: All
- Channel: All
- Transaction: Quote

Behavior(s):
- Warning: A warning message is displayed: "UM limits must equal UIM limits before issuing the policy." User may complete the quote.

FIG. 6

Default

▸ Details

* Behavior Set Name

Default

* Effective Date　　* Expiration Date　　　　　　　Business Data Type

Data Dict. Value　　　Data Dict. Value　　　　　　　Data Dictionary Value

Field Name

Data Dictionary Field Display Name

Field Description

Data Dictionary Value

Copy　Cancel　Save

FIG. 8

Properties

Values

*Minimum Value  *Maximum Value
Data Dictionary Value  Data Dictionary Value

Default Value
○ Always  ◉ Never  ○ By Expression

Required
○ Always  ◉ Never  ○ By Expression

Visible
◉ Always  ○ Never  ○ By Expression  ○ By Reflexive

Editable
◉ Always  ○ Never  ○ By Expression ( Copy ) ( Cancel ) ( Save )

FIG. 10

Required - By Expression

Required

○ Always　　　○ Never　　　⦿ By Expression

Expression Name ▢

Expression Description ▢

Select Expression ▢

*Execute Upon
[Page Load and Field Exit ▼]

*Execute Upon Field
[Field 2 ▼]

FIG. 12

Default Value By Condition

Default Value
○ Always   ○ Never   ⊙ By Expression

Expression Name
Expression Display Name

Expression Description
Expression Description                    Replace Expression

***If True, Default To
Calculated Value ▼

Calculation Name
Calculation Display Name

Calculation Description
Calculation Description                   Replace Calculation

***Else, Default To
No Default ▼

***Execute Upon
Page Load

FIG. 13

Advanced

Scope

Select the Scope items you would like to view and configure by. ☐

Scope Item 1      Scope Item 2
[ABC ▼]           [DEF ▼]
Scope Item 3      Scope Item 4
[GHI ▼]           [JKL ▼]

(Apply)                                    (Cancel) (Save)

Authority Settings

Define Authority settings for the field. ☐

Level    Restricted Values    Message Text

No Authority Settings have been Configured.

(Remove)                                   (Edit) (Add)

Reflexive Settings

Choose Reflexive Field type and refer to Parent field to define Child field visibility settings. ☐

Reflexive Field Type
[ ▼ ]

Parent Value              Child Fields

No Reflexive Settings have been Configured.

(Remove)                                   (Edit) (Add)

FIG. 17

| [Field Name] - Behavior Sets | | | | | | | | | |
|---|---|---|---|---|---|---|---|---|---|
| Behavior Set | Eff Date | Exp Date | Scope Item 1 | Scope Item 2 | Scope Item 3 | Scope Item 4 | Valid Values | Default | Required | Visible |
| Behavior Set 1 | 1/1/1999 | 12/31/2099 | ABC, DEF GHI, JKL | ABC, DEF | ABC, DEF | ABC, DEF | 1000,2000, 3000,4000 | Always | Never | Always |
| Behavior Set 2 | 1/1/1999 | 12/31/2099 | ABC, DEF GHI, | ABC, DEF | ABC, DEF | ABC, DEF | 20000, 30000 | Always | Never | Always |
| Behavior Set 3 | 1/1/1999 | 12/31/2099 | ABC, DEF GHI, JKL | ABC, DEF | ABC, DEF | ABC, DEF | 5000, 6000, 7000, 8000, 9000 | Never | Always | By Expression |

FIG. 18

Child Field - Numeric Parent Field

▼ Reflexive Settings

Choose Reflexive Field type and refer to Parent field to define Child field visibility settings.

Reflexive Field Type

[Child]

Parent Field          Parent Value(s)

[Field Name]              [> 500]

Child Field - Valid Value Parent Field

▼ Reflexive Settings

Choose Reflexive Field type and refer to Parent field to define Child field visibility settings.

Reflexive Field Type

[Child]

Parent Field          Parent Value(s)

[Field Name]              [(2) Sample Value 1, Sample Value 2]

FIG. 20

Valid Value BDT Lightbox

Reflexive Settings

*Parent Value
Sample Value 2

*Child Fields
(1) Field 3

Cancel  Save

Numeric BDT Lightbox

Reflexive Settings

*Operator     *Value
>             4000

*Child Fields
(1) Field 2

Cancel  Save

FIG. 21

| view by: | Scope Item 1 | Scope Item 2 |
| --- | --- | --- |
| | Select One ▼ | Select One ▼ |
| | Scope Item 3 | Scope Item 4 |
| | Select One ▼ | Select One ▼ |
| view by: | Scope Item 1 | Scope Item 2 |
| | Select One ▼ | Select One ▼ |
| | Scope Item 3 | Scope Item 4 |
| | Select One ▼ | Select One ▼ |
| view by: | Scope Item 1 | Scope Item 2 |
| | Select One ▼ | Select One ▼ |
| | Scope Item 3 | Scope Item 4 |
| | Select One ▼ | Select One ▼ |
| view by: | Scope Item 1 | Scope Item 2 |
| | Select One ▼ | Select One ▼ |
| | Scope Item 3 | Scope Item 4 |
| | Select One ▼ | Select One ▼ |

FIG. 24

New Behavior Set

▼ Details

*Behavior Set Name

*Effective Date
Cons App Value

*Expiration Date
Cons App Value

*Function Category
(All)

*Business Function
(All)

Expression Name
Expression Name 1

Expression Summary

Field 1 = ABC

▲ Scope

▼ Outcomes

*Edit Behavior
Select One

*Message Text
Lorem ipsum dolor sit amet, consectetuer adipiscing elit.

Select Existing Message

Copy  Cancel  Save

FIG. 29

[Expression Name] - Behavior Sets

| Behavior Set | Eff Date | Exp Date | Business Function | Scope Item 1 | Scope Item 2 | Scope Item 3 | Scope Item 4 | Outcome |
|---|---|---|---|---|---|---|---|---|
| Behavior Set 1 | 1/1/1999 | 12/31/2099 | Business Function 1<br>Business Function 2 | All | ABC, DEF | ABC, DEF, GHI | JKL, MNO, PQR | Competency |
| Behavior Set 2<br>Validation: | 1/1/1999 | 12/31/2099 | Business Function 3 | ABC, DEF, GHI<br>JKL, MNO, PQR | ABC, DEF, GHI<br>XYZ | ABC, DEF | XYZ | Data<br>Hard Edit/Proceed |
| Behavior Set 3<br>Warning/<br>Notification | 1/1/1999 | 12/31/2099 | Business Function 5<br>Business Function 6 | ABC, DEF, GHI<br>JKL, MNO, PQR | JKL, MNO | TUV | ABC, DEF, GHI | |

FIG. 30

BEHAVIOR SETS METHOD AND SYSTEM

RELATED APPLICATIONS

This application claims priority to U.S. Provisional Patent Application Ser. No. 61/488,494, filed May 20, 2011, which is also incorporated herein by reference in its entirety.

TECHNICAL FIELD

The present description relates generally to a system and method, for providing a behavior sets system, and more particularly, but not exclusively, to generating field and rule sets of behaviors (behavior sets) for an insurance policy and claims processing computer system.

BACKGROUND

In processing insurance policy and claims from an insurance customer, an insurance claim agent typically asks a variety of questions to the insurance customer. An insurance policy and claims processing center typically employs an insurance policy and claims processing computer system for processing insurance claims from insurance customers. The insurance processing computer system(s) may be used by various employees at the claim processing center to set up new policies, do insurance quotations, endorse existing policies, establish new claims, or process and update existing claims. The insurance policy and claims processing computer system may be operative to display various graphical user interfaces that an insurance claim agent uses when asking questions to an insurance customer and when the insurance claim agent receives answers to those questions. In some circumstances, the insurance claim processing center desires to order the presentation of questions and various graphical user interfaces. Data and logic are modified regularly and historically involve high cost of ownership and time, and logic and data processing changes are far too frequent for traditional "design, build, test" IT development, which creates a tremendous backlog in the necessary changes as well as unsatisfied product enhancements and new product development. A "configurable" systems may use scripting as a faster alternative to design, code, test, but these systems still require highly skilled resources and limit the impact of any given configuration change to a single UI or code module. An insurance processing system is traditionally extremely complex and requires an individual, such as a computer program developer, who has a skill set that includes the computer programming language in which the insurance claim processing computer system was written. Hence, the insurance claim processing center incurs additional burdens, including fees to the computer program developer and lag time, each time the insurance claim processing center desires to change the order or display of the graphical user interfaces. In addition, when an insurance company's IT department does not have sufficient personnel with the technical skill set to add or create questions using the insurance claim processing computer system, the insurance claim processing center realizes additional expenses in training or hiring the personnel with the requisite skill set. Additionally, these resources are very expensive. Moreover, making modifications to existing insurance claim processing computer systems requires disabling access to and shutting down the systems connected to the insurance claim processing computer system. Hence, when the insurance claim processing center desires to change the order or display of the graphical user interfaces, the insurance claim processing center must shut down the entire insurance claim processing computer system. This shutting down process results in downtime of the insurance claim processing center, which translates into lost revenue and lost worker productivity.

SUMMARY

Behavior sets were developed because traditional methods of coding changes in insurance applications are too slow and cumbersome. In addition, insurance applications are too difficult to maintain once coded. The behavior sets system generates behavior sets services (e.g., web service) that are responsive to multiple user interfaces (e.g., consuming application user interfaces for various insurance policy and claims channels, such as direct, mobile, and call center). The behavior sets service is independent of the multiple different target interfaces and accessible by the multiple different target interfaces. The system includes a processor coupled to a memory. The memory includes behavior sets instructions executable by the processor that when executed by the processor cause the processor to identify a target object defined for multiple different target interfaces. The behavior sets system generates resultant behaviors defined for the target object for multiple different target interfaces to consume. The behavior sets system defines the resultant behaviors for the target object. The multiple resultant behaviors define a behavior set, and different resultant behaviors define other behavior sets. Defining a behavior set, includes analyzing the resultant behaviors of each behavior set. The behavior sets system may generate a behavior sets service (e.g., web service) that includes multiple behavior sets, wherein the behavior sets service provides the resultant behaviors for the target object for use by the multiple user interfaces. The behavior sets system communications interface is configured to provide the behavior sets service to the multiple user interfaces, via a network (e.g., the Internet). The behavior set configuration also greatly expedites development time by allowing insurers to release insurance product changes to market more quickly.

Other systems, methods, features and advantages may be, or may become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 4 is a screenshot of a behavior set field example.

FIG. 6 is a screenshot of behavior sets rule example.

FIG. 8 is a screenshot of a behavior set field details.

FIG. 10 is a screenshot of behavior set field properties.

FIG. 12 is a screenshot of behavior set field required by expression properties.

FIG. 13 is a screenshot of behavior set field default value by condition properties.

FIG. 17 is a screenshot of advance scope items, authority settings, and reflexive settings parameters FIG. 18 is a screenshot of multiple behavior sets.

FIG. 20 is a screenshot of other advance reflexive settings parameters for a child field.

FIG. 21 is a screenshot of other reflexive settings parameters.

FIG. 24 is a screenshot of behavior set view by scope items parameters.

FIG. 29 is a screenshot of behavior sets details and outcomes parameters for rules.

FIG. 30 is a screenshot of other behavior sets settings comparison.

DETAILED DESCRIPTION

Figure 1:
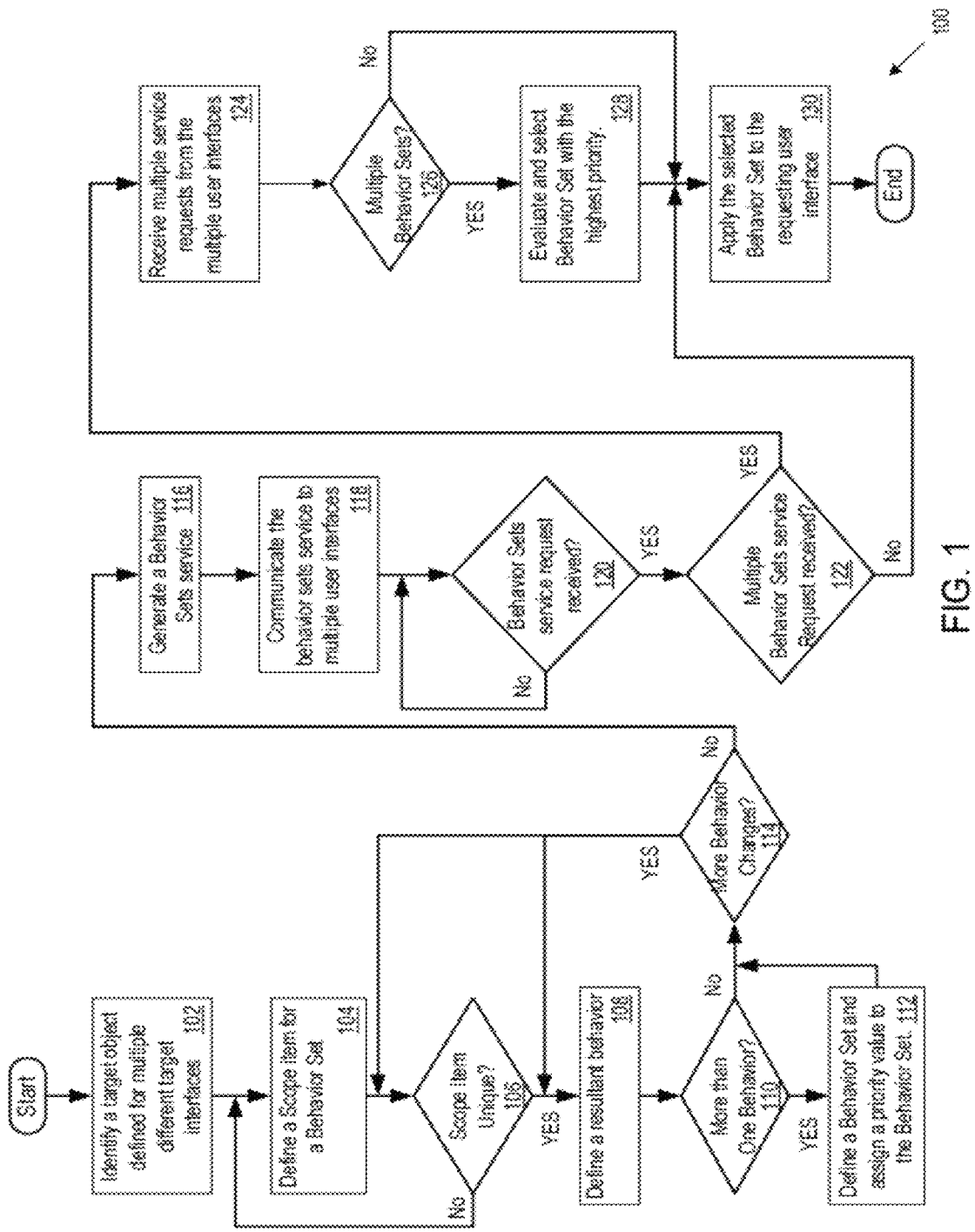
FIG. 1 is logic flow for implementing behavior sets.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Behavior sets is a construct that allows for flexible configuration for multiple systems (e.g., insurance systems). Claims, policy, and underwriting rules change, and data capture changes may be performed through behaviors sets. Also, as carriers roll out new insurance products to the market, or make changes to existing insurance products in the market, these changes may be done through behaviors sets. Behavior sets makes maintaining insurance policy and claims management a lot simpler. The behaviors sets system provides the user the ability to configure field and rule behaviors based on a defined set of scope for the resultant behavior, independent of the consuming application user interface. Behavior sets replace what historically has been complex code requiring the skills of a programmer. The behavior sets system extracts the scope into a defined set of parameters by which insurers typically vary the rules. Examples may include rating the company, the state, and transactions are known and/or may be determined by a defined set of parameters.

In today's fiercely competitive marketplace, insurers and financial services professionals rely on agility and innovation to achieve success. Services professionals offer a broader range of products that can be tailored and priced to individual needs, as well as customize offerings for different sales channels including resellers and distributors. Policy systems may use behavior sets to provide customers the ability to generate online quotes according to the rules defined by the carrier. These same behavior sets may be deployed online, in agencies and call centers, and to individual brokers, guaranteeing a consistent offerings and quality of service across one or more sales channels (e.g., called by a policy processing system during a quote, a new application for insurance, and/or an endorsement as a user is completing an application, or called during batch processing). Behavior sets enforce the carriers' logic (e.g. effective date of a policy may be determined by a behavior set established for the effective date) and allows policy processing systems to enable customers to shop for insurance online, select coverage options that best meet to their individual needs, instantly obtain a quote, and ultimately finalize and sign their contract online.

Organizations maintain massive proliferations of rules in order to vary behaviors across business products and other scope criteria. An alternative approach is to embed logic in user interfaces, also requiring duplication of logic across user interfaces. Traditionally insurance systems are built with logic embedded in the user interfaces (UIs) that were hard to change. Subsequently, rules systems and engines made developing rules easier and more intuitive, but did not allow or simplify the process of managing large volumes of rules. Behavior sets allows business users to develop, trace, and maintain the product rules easily. Absent the behavior set system, the volume of configuration information becomes highly duplicated, extremely complex, and difficult to maintain. Behavior sets provides the ability to configure multiple data and business rule behaviors for an application in a uniquely organized fashion, and thereby, eliminating mass proliferation of redundant and duplicate configuration information typically needed in software and custom information technology applications. The behavior set system provides the user the ability to configure field and rule behaviors independent of user interface and based on a defined set of scope. The scope of each behavior set is a configurable set of criteria by which logic often varies within insurance products. The behavior sets system may be preconfigured with scope items for behavior sets including channel, transaction, writing company, policy tenure, and state. Instead of embedding the scope items within each individual rule or field definition, the behavior sets system (e.g., a configurator of the behavior sets system) may simply select the applicable scope set to apply to each definition, thereby greatly reducing the time and complexity to configure. The behavior set system user may define behavior sets without requiring coding and without proliferating rules to cover all the variations required by the business. The approach used by the behavior set system vastly simplifies the number of business rules and complete product variations typically needed to support the business. The behavior set system parameterizes what would otherwise be rule and/or UI logic. In addition, the behavior set system is accessible to a business configuration user, rather than code or programming syntax delivered by a technology resource. The innovation facilitates both initial configuration and also simplifies maintenance and the ongoing lifecycle of configuration management.

The behaviors sets system improves various insurance policy and claims channels' (e.g., application user interfaces data center channel, agent channel, direct channel, home office channel, mobile channel) ability to market and service personal and commercial lines of insurance, policy changes, cancellations, reinstatements, and rewrites, audits, renewals. The behaviors sets system facilitates the ease of doing business, underwriting quality management, adaptability by agents, policyholders, underwriters, customer service representatives, manage customer accounts, improves profitability, eligibility rules, evaluation forms and risk scoring. The behaviors sets system is highly configurable to adapt to new market opportunities, includes a web user interface and wizards to assist the user through workflow and activities, business rules, product model-offerings, coverages, limits, forms, eligibility. The behaviors sets system enables carriers to more quickly implement and deploy the rules and insurance products to quoting, policy administration, and claims systems which in turn increases productivity, customer satisfaction, adaptable to agent preference, lowers underwriting management expenses, reduces information technology support costs, and shortens time-to-market for various products.

FIG. 1 is logic flow 100 for implementing behavior sets. The behavior sets system implements a method for generating behavior sets services (e.g., web services) responsive to multiple user interfaces (e.g., consuming application user interfaces for various channels, such as direct, mobile, and call center). The user identifies a target object defined for (consumed by) multiple different target interfaces (e.g., consuming application user interfaces for various channels such as direct, mobile, and call center) for the behavior sets system (102). The user defines for each behavior set a scope, including a product structure scope, and a run-time scope, discussed below (104). The behavior sets system determines whether the scope of a behavior set is unique for the behavior set, including a unique product structure scope, and run-time scope combination (106). The behavior sets system defines the resultant behaviors for the target object by analyzing the resultant behaviors of each behavior set (110, 114), and generating a behavior sets service (e.g., web service) that includes the behavior sets (108) (116). The behavior sets service provides the target object resultant behaviors for use by the multiple user interfaces (e.g., consuming application user interfaces for various channels, such as direct, mobile, and call center). The behavior set system analyzes the behavior set configuration to determine whether each behavior set as a whole is not in contention with other behavior sets configured within the same context. The behavior set service may assign a priority value or another tracking and prioritization mechanism to each behavior set based on selection logic (112) so that at runtime the appropriate behavior set is applied to the consuming application user interfaces. For example, the scope of the behavior sets may be used as a means to determine which of multiple behaviors apply to a consuming application user interface. The behavior sets system communicates and/or provides access to the behavior sets service to the multiple user interfaces for consumption so that the field and/or rule changes are realized by the end user of the particular channel (118) (120). In one example, the multiple different target interfaces may be different user interfaces issuing the same or similar transaction for consuming application user channels. The channel may include direct, agency, call center, home office, and mobile channels. When the behavior sets service (e.g., web service) receives multiple behavior sets service requests, the behavior sets system may apply selection logic to determine the behavior set to apply to a particular consuming application user interface (122) (124). The behavior set service may use the scope of each behavior set, an assigned priority value, and/or another tracking and prioritization mechanism to determine at runtime the appropriate behavior set to be applied (126) (128) to consuming application user interfaces (130). While the logic flow 100 for implementing behavior sets is illustrated for multiple user interfaces the same process may be applicable to non-user interface implementations such as backend processes (e.g., automated processes).

Figure 2A:
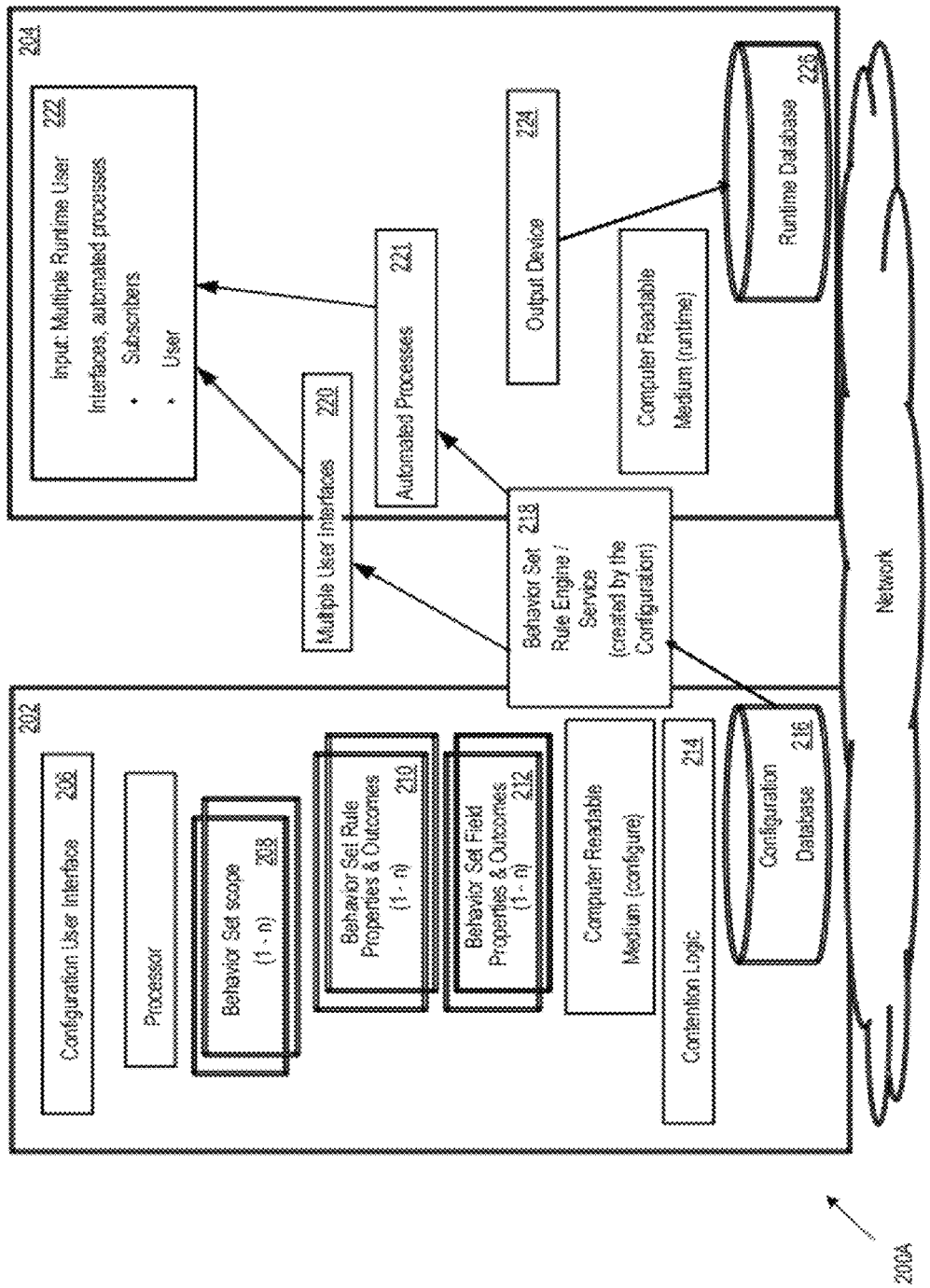
FIG. 2A shows a block diagram of behavior sets configuration components and runtime use of behavior sets.

FIG. 2A shows a block diagram 200A of behavior sets configuration components 202 and runtime components 204. A configuration user interface 206 allows users to configure behavior sets including behavior set scopes 208, behavior set rule properties and outcomes 210, and behavior set field properties and outcomes 212. The behavior set system uses contention logic 214 to determine whether a behavior set configuration as a whole is in contention with any other behavior set configured within the same context. Configured behavior sets are stored in a configuration database 216 and used to generate the behavior set service 218 used during runtime.

Multiple user interfaces 220 and automated processes 221 (e.g., backend batch processing) consume the behavior set service 218. The multiple user interfaces 220 and automated processes 221 (e.g., backend batch processing) may include subscribers and users 222 (e.g., consumers of the behavior set service 218). The multiple user interfaces 220 and automated processes 221 (e.g., backend batch processing) may use output devices 224 to store output in runtime databases 226.

The behavior set service 218 may be used in a non-user interface implementation. For example, rating an auto policy may include using a rule that requires that automobiles have a garage location in order to be rated. Although the auto policy rule may normally be executed by the user selecting a "rate" button on a user interface, the auto policy rule may also be used by an agency system uploading risk data for rating using an automated and/or batch process without the need for a user interface. Multiple behavior sets may be used, for example, one behavior set may be usable with user interface based processing, and another behavior set may be usable with non-user interface processing such as before a rating module is invoked in order to ensure that a garage location is associated with each vehicle (e.g., automobile) and supplied to the agency system supplied.

Figure 2B:
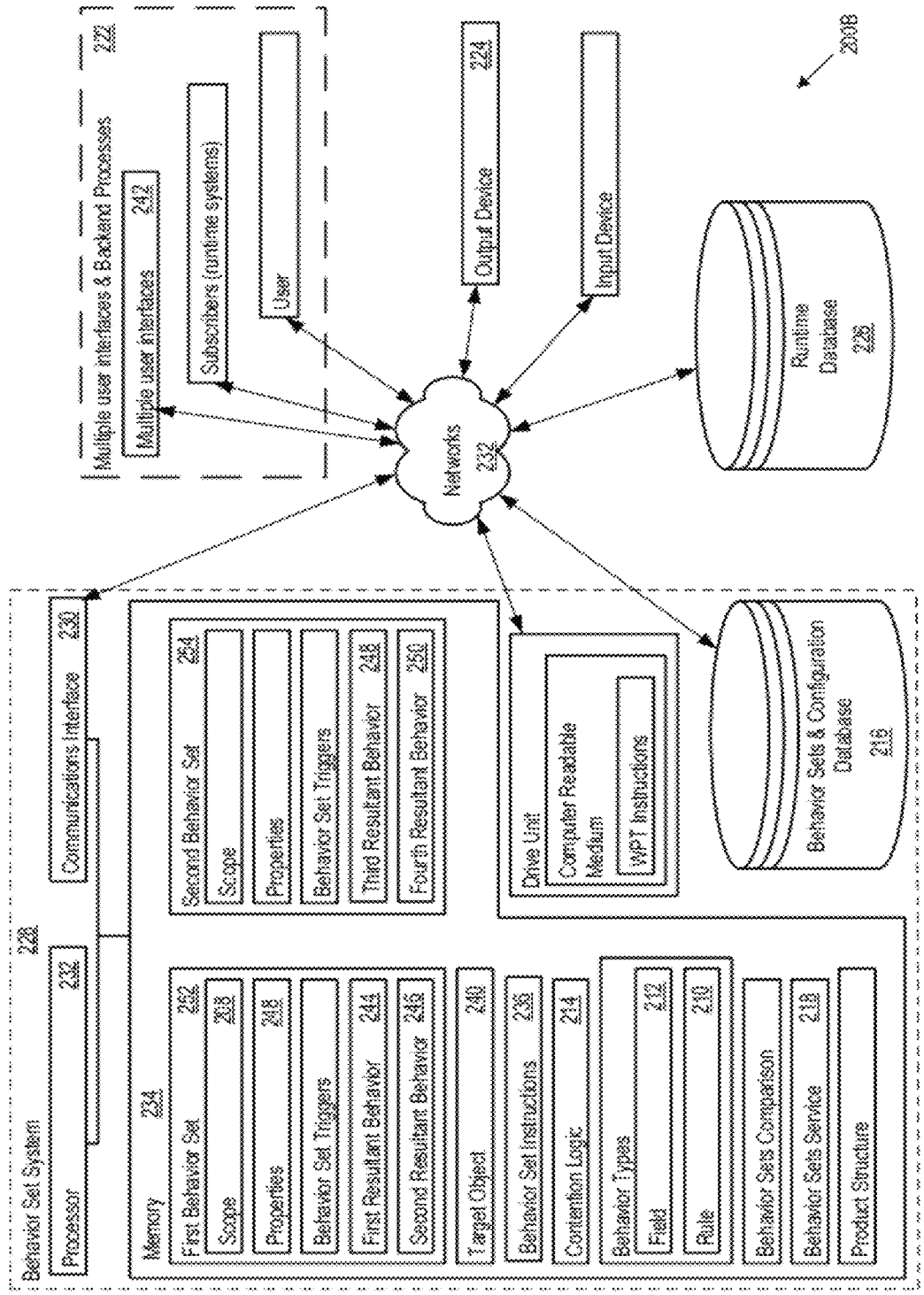
FIG. 2B is a block diagram of an example behavior sets system configuration.

FIG. 2B is a block diagram of an example behavior sets system configuration 200B. The behavior sets system configuration 200B includes the behavior sets system 228 that provides a communications user interface 230. The behavior sets system 228 includes a processor 232 coupled to a memory 234 and the communication interface 230, in communication through a network 232 (e.g., the Internet) with various components of the system configuration 200B. The processor 232 of the behavior sets system 228 may include a central processing unit (CPU), a graphics processing unit (GPU), or both. The processor 232 may be a component in a variety of systems. For example, the processor may be part of a standard personal computer or a workstation. The processor 232 may be one or more general processors, digital signal processors, application specific integrated circuits, field programmable gate arrays, servers, networks, digital circuits, analog circuits, combinations thereof, or other now known or later developed devices for analyzing and processing data. The processor 232 may implement a software program, such as code generated manually (e.g., programmed). The memory 234 includes behavior sets instructions 236, executable by the processor 232, that when executed by the processor 206 cause the processor 232 to identify a target object 240 defined for multiple different target interfaces 242. The behavior sets instructions 236 cause the processor 232 to generate resultant behaviors (244, 246, 248, and 250) defined for the target object for the multiple different target interfaces 242 to consume. The behavior sets system 202 defines the resultant behaviors (244, 246, 248, and 250) for the target object 240. One or more resultant behaviors (244, 246) define a behavior set 252, and different resultant behaviors (248, 250) define other behavior sets 254. Defining a behavior set, includes analyzing the resultant behaviors of each behavior set, and generating, using the behavior sets system, a behavior sets service 218 (e.g., web service) comprising the behavior set 252. The behavior sets service 218 provides the resultant behaviors for the target object 240 for use by the multiple user interfaces 242. The behavior sets system 228 communications interface 230 is configured to communicate and/or provide access to the behavior sets service 218 to the multiple user interfaces 242 via the network 232 (e.g., the Internet).

Figure 3:
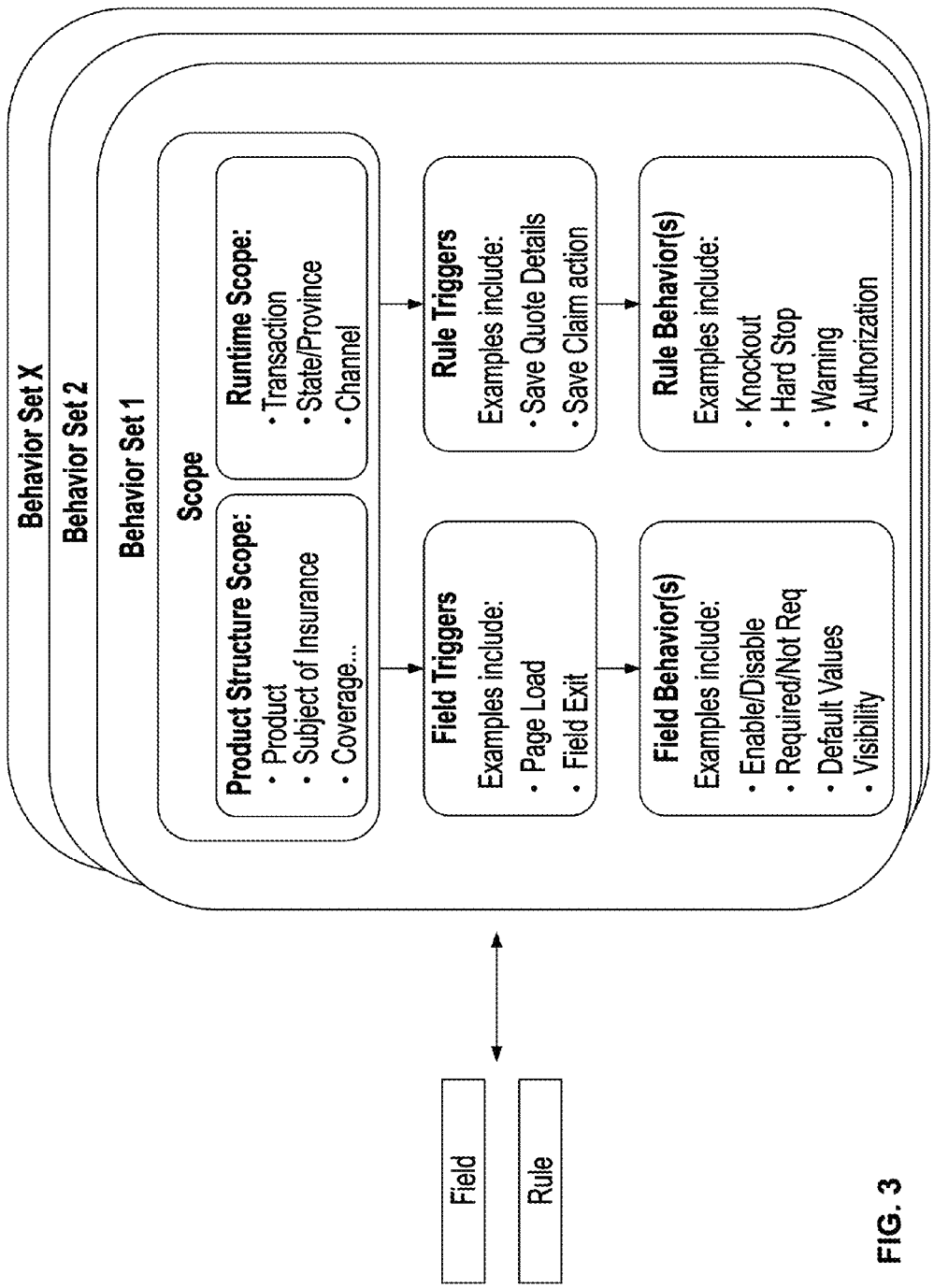
FIG. 3 is a graphical representation of a high level description of behavior sets.

FIG. 3 is a graphical representation of a high level description of behavior sets. The behavior sets system creates behavior sets that define resultant behaviors for fields and rules in the runtime system, based on triggers and the scope. Behavior set properties include enable/disable, required/not required, default value, visible/not visible, and editable/not editable. Field behaviors may further be defined to exhibit respective behaviors always, never, and/or by expression. The field triggers may include a page load, and field exit. Each behavior set includes a product structure scope, and a run-time scope. The product structure scope includes a product description, a subject of insurance, and coverage. The run-time scope includes a transaction, state/province, and channel. The scope of a behavior set may be unique for the behavior set, including a unique product structure scope, and run-time scope combination.

The behavior sets page allows a user to configure a behavior set for expressions and behavior sets that reside in a 3rd Party behavior sets engine within the context of a consuming application. A behavior set is a group of scope and outcome configurations that determine how a behavior set executes for a specific scope at application runtime. Behavior sets are comprised of the following properties: effective date, expiration date, outcomes, business function and scope (business functions and scope items are specific to the consuming application). The behavior set page is comprised of the behavior set list and is divided into three main configuration sections: details, scope and outcomes. When the user navigates to the behavior sets page, the screen is in "Add" mode for a "New behavior set." The page supports the ability to accept the consuming application's "View Type" (preset scope items applicable to the consuming application), limit the list maintain and define the expiration and effective date values as needed. The page may also accept the following items related to each scope Item: values (dropdown selections), visible settings, and enabled settings. The user may then edit these prefilled configuration selections. The copy button may reload the page in "Add" mode using the current behavior set's configurations to pre-populate the screen of the new behavior set. The copy button is not enabled in "Add" mode until the record in context is saved, but may not enabled in "Edit" and "View" modes. Consequently, the user may not use copy until the new behavior set is saved. If the user attempts to copy without first saving the configurations s/he may receive an error message. A user also has the ability to copy a behavior set. If the user copies an expired behavior set the past dates may pre-populate the new behavior set's date fields, but are editable.

The cancel button clears any unsaved data from fields and reloads the UI as it was previously loaded (e.g., either default page selections or as a saved configuration). If the user makes any changes to a previously saved configuration without saving again then clicks cancel, the page may reload to display the saved configuration. The 'Save' button prompts the system to run validation checks before saving the data entered into the fields and reloading the page in "Edit" mode. Once the behavior set is clear of any errors the data is saved, the page loads in "Edit" mode, the behavior set name in the list maintain updates to the User-created name, the list maintain is sorted alphabetically and the panel header also updates with the user-created behavior set name. Until the behavior set is saved, the user may not navigate to another page unless selecting "Cancel" to clear their work from the fields.

Once the configurations for the behavior set are complete the user may click "Save," prompting the system to perform contention check on the entered information. The behavior set system establishes that the behavior set configuration as a whole is not in contention with any other behavior set configured within the same context. If a contention error occurs, the behavior set system may receive a hard edit and may not be allowed to save the data until the contention error has been fixed. The user may view the contention error screen to view the error message displayed to the behavior set system. If no contention errors exist, the entered data may be saved and remain in the fields for the user to view and/or edit.

Once the behavior set is clear of contention errors, the user may configure additional behavior sets for the expression or return to the consuming application. If the user wishes to use the current behavior set's configurations as a template for a new behavior set, they may click "Copy" to have the UI reload in "Add" mode with the configurations pre-populating the fields. If the user does not wish to use any previous configurations as a template they may click "Add" and prompt the UI to refresh in "Add" mode to configure the new behavior set. The behavior sets list displays to the user in a list maintain format the behavior sets configured for the expression. The consuming application has the ability to limit the list to display either the behavior sets in context or to display all of the behavior sets configured for the expression across all contexts. The behavior set system may also further limit the list by behavior set status, "Expired" or "Active." If the behavior set system selects "Active" then the active behavior sets within the predefined context may display in the list. If the behavior set system selects "Expired" then the expired behavior sets behavior sets within the predefined context may display in the list. As each behavior set is saved the user-created name for the behavior set may populate the behavior set list, replacing the text "New behavior set," and the list may sort alphabetically. When the behavior set system clicks "Add," "New behavior set" may appear as the bottommost list item. If behavior sets exist when the page launches then the first record in the list may be selected and in "Edit" mode.

To compare the configured behavior sets, the user may click on the "compare behavior sets" link to view the "behavior set comparison" table. The behavior set comparison table opens as a new window. If the consuming application does not wish to limit the list by context then all of the behavior sets configured for the expression may appear in the list. Upon page load, the first record may be highlighted and the page may load in "Edit" mode for that record. Assuming no other behavior sets have been configured for the expression then "new behavior set" may appear as the list item in view when the page loads and may be in "Add" mode. If the consuming application wishes to limit the list by context, then the behavior sets falling within the same context may be displayed. Upon page load the first record within that context may be highlighted and the page may load in "Edit" mode for that record. Assuming no other behavior sets have been configured for the expression then "new behavior set" may appear as the list item in view when the page loads and may be in "Add" mode. The "Details" section allows the user to create a behavior set name, as well as, edit the expression's behavior set effective and expiration dates and select the applicable function categories and business functions. The section also displays the expression display name and expression summary. When the page first loads, the behavior set name field may be blank and the user is required to enter a name else a contention error may occur.

FIG. 4 is a screenshot 400 of a behavior set field example. For the field "bodily injury (BI) limits of liability" a first behavior set for the majority of scenarios includes a runtime scope for all states, channels, and transactions, where the behaviors include the field is required, visible with a default value of 50,000, and the valid values include 50,000, and 100,000, and 200,000. The second behavior set establishes exception behavior for the state of Illinois so that the default value and valid values are different from the first behavior set. The second behavior set includes a runtime scope for the state of Illinois, all channels, and all transactions, where the behaviors include the field is required, visible with a default value of 100,000, and the valid values include 100,000, and 200,000. The scopes of the behavior sets, as exampled above, are unique for each behavior set.

Figure 5:
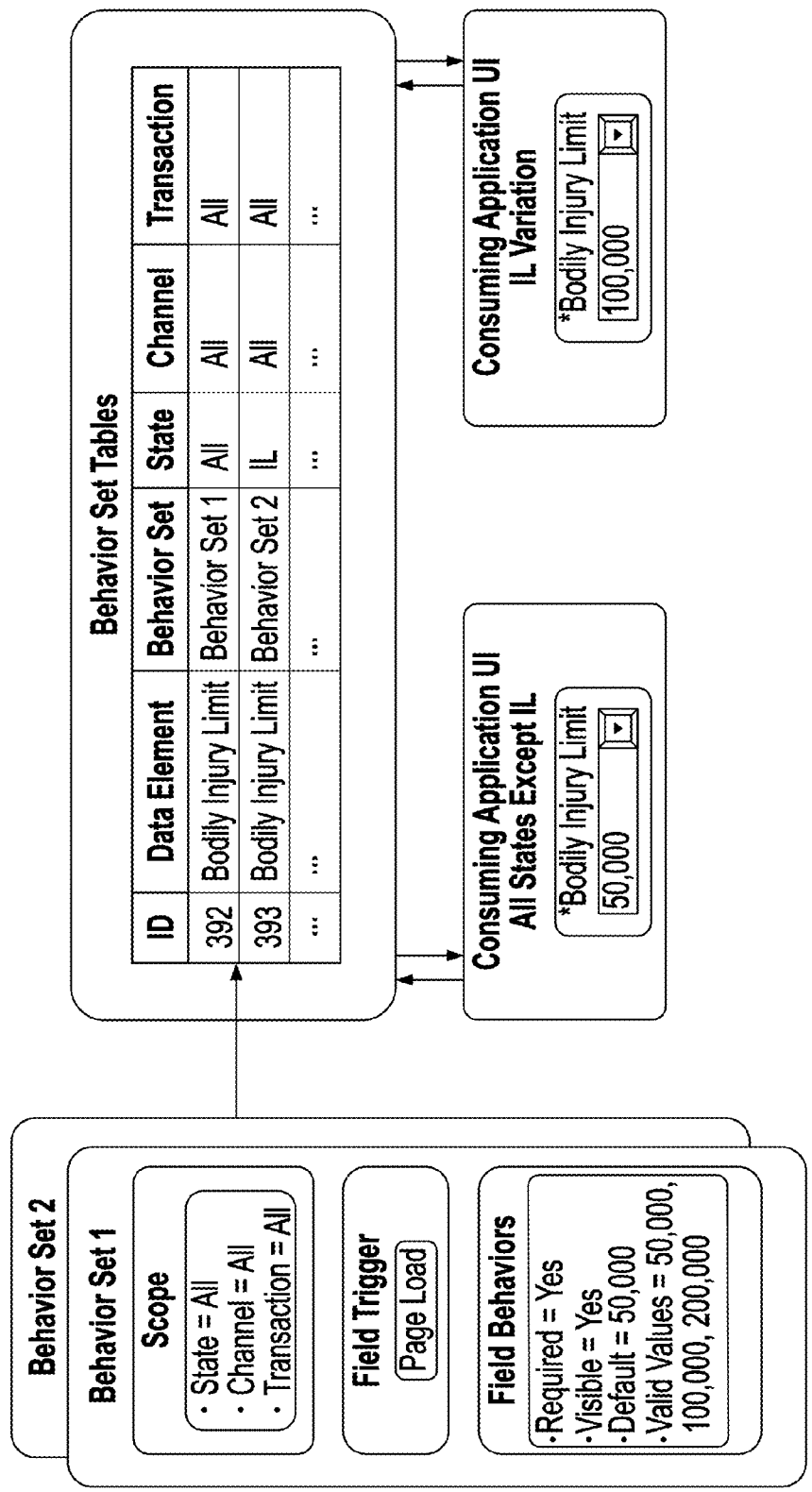
FIG. 5 is a screenshot of a behavior set field example diagram.

FIG. 5 is a screenshot of a behavior set field example diagram. Configuration user creates the behavior sets for bodily injury limit data field (e.g., data element with id 392 and 393 as shown in FIG. 5). The parameterized data for each behavior set is stored in tables. Consuming applications search by scope show how the data may behave on the user interfaces (UIs). For each of the consuming applications for the respective channels use different application user interfaces that include the bodily injury limit field and the application user interfaces consume the behavior set service behavior sets. The behavior set service applies the appropriate behavior set based on contention logic. For example, the scope of the behavior sets may be used to determine which of multiple behaviors apply to a consuming application user interface.

FIG. 6 is a screenshot of a behavior set rule example. For the rule "UM limits must be equal UIM limits" a first behavior set for the majority of scenarios includes a trigger on "save coverage details" that when triggered applies the rule for a runtime scope of all states, all channels, and all transactions, where the behaviors include a hard edit/stop behavior, where a hard edit error message is displayed such as "UM limits must be equal UIM before issuing the policy." In order for a runtime user to continue the user may be prompted to satisfy the rule. The second behavior set is an exception behavior for a quote transaction (different from the first behavior set). The second behavior set includes a runtime scope defined for all states, and all channels, but a runtime scope for transactions of "Quote", where the behaviors include generating and displaying a warning message such as "UM limits must equal UM limits before issuing the policy." The user may complete the quote in order for the policy to issue.

Figure 7:
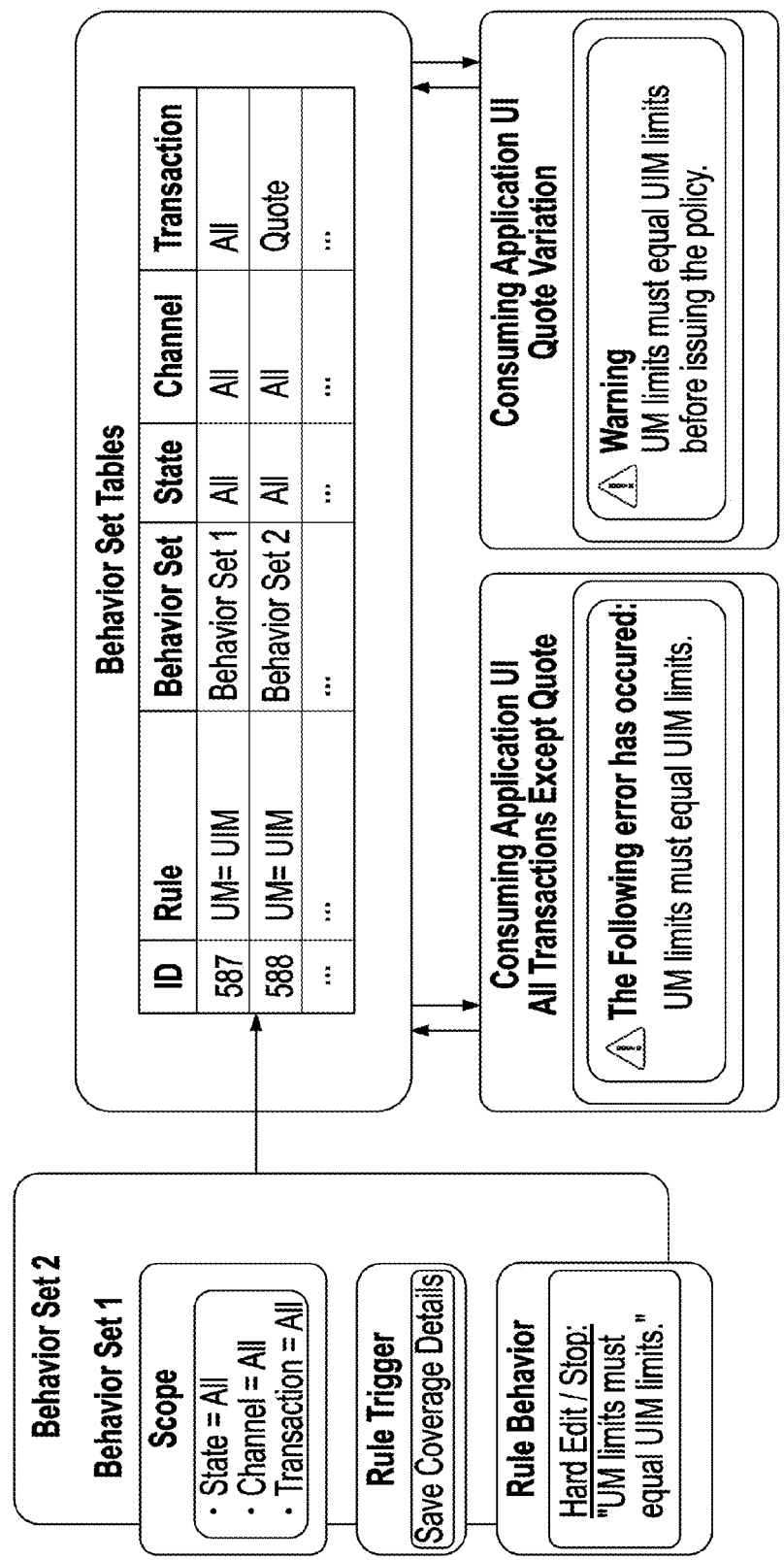
FIG. 7 is a screenshot of a behavior sets rule example diagram.

FIG. 7 is a screenshot of a behavior sets rule example diagram. The configuration user creates the behavior sets for the "UM must equal UIM" rule. The parameterized data is stored in tables (e.g., in the behavior sets database). The consuming application searches (e.g., multiple user interfaces 216) by scope show when to execute the rule, and what behavior to implement for that rule.

FIG. 8 is a screenshot of a behavior set field details. The "Details" section allows the user to create a behavior set name, as well as, edit the expression's behavior set effective and expiration dates and select the applicable function categories and business functions. The section also displays the expression display name and expression summary. The effective and expiration dates may be pre-filled with the applicable dates as defined by the consuming application, but may remain editable within the expression date range as defined in expression editor. A contention error may be displayed if the user attempts to set and save a date that falls outside the expression editor date boundaries or if the user sets an expiration date prior to the effective date. The behavior set system may set an expiration date to the system or past date in order to expire the behavior set. When the field details page first loads, the behavior set name field may be blank and the user enters a name or else a contention error may occur. The behavior set name field may remain editable after selecting the save button. The behavior set name may be blank when the page initially loads for a new behavior set. The behavior set name field is editable to the user. For the effective and expiration dates, the page accepts whether or not the date fields are enabled or disabled. Once the user saves the data, the panel header and behavior set list names may update to the new behavior set name. The behavior set name field may remain editable even after selecting the "Save", and accepts alphanumeric characters.

Figure 9:
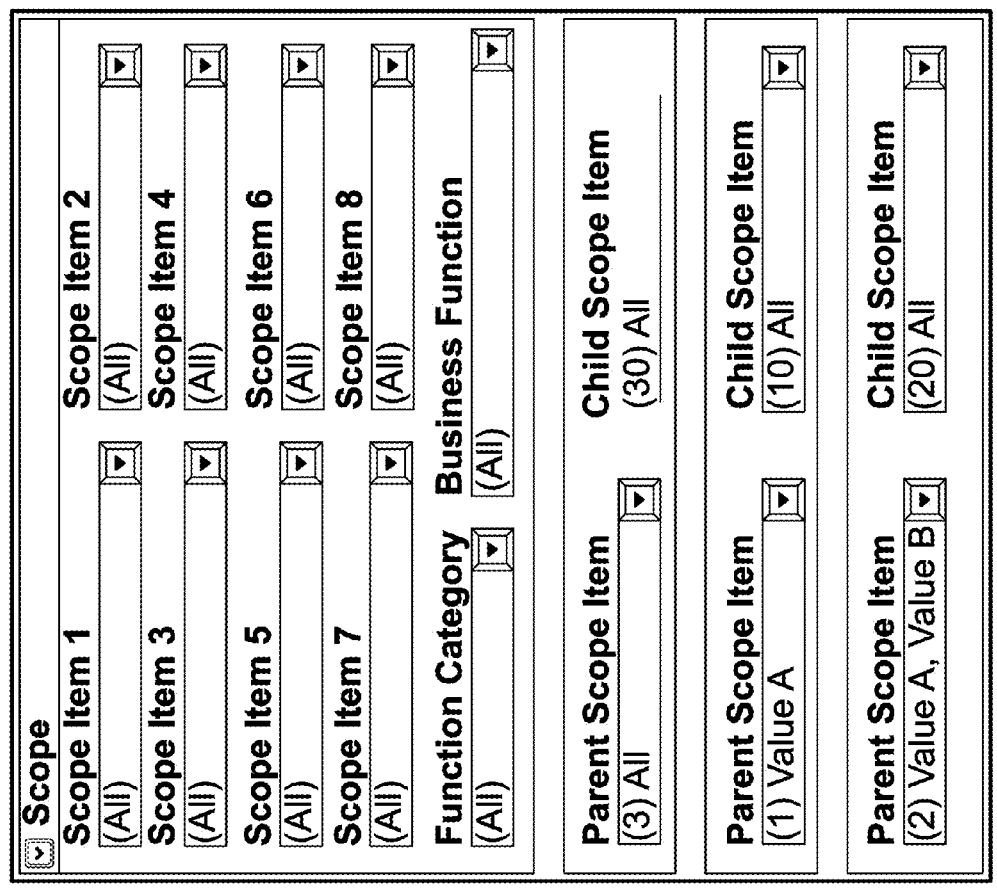
FIG. 9 is a screenshot of a behavior set related scope items.

FIG. 9 is a screenshot of a behavior set related scope items. The scope page accepts each scope Item as well as the following items related to each scope Item: value, visible settings, and enabled settings. By default, the section header is collapsed when the behavior set page initially loads. Each scope item is a set of table-driven values specific to each consuming application (e.g., multiple user interfaces 216) which passes in each dropdown item's display names and values. The consuming application may also pass in the dropdown's editable and visibility properties by determining whether or not the dropdown is enabled versus disabled and either visible or hidden. If no specific data item for the scope field has been passed in then the dropdown may by default be "All." Also, if there is a code relation between scope items then the dependent field may be disabled until a value has been selected in the parent field. The consuming application may also pass in a subset of values, creating a view that includes explicit specification for that scope. If a view limits the scope item to two out of five possible category values, then the scope dropdown may display "All" if those two values are both selected.

FIG. 10 is a screenshot of behavior set field properties. The properties page may also accept the following items related to each scope Item: values, default values, required, editable, visible, and enabled settings. The page may load with the chosen behavior set selection template and the user may edit these prefilled configuration selections. The behavior set navigates the user to the process behavior set in context. If the user clicks on a configured list item, the screen refreshes and displays the configured details for the chosen behavior set variation until the configuration is saved.

Figure 11:
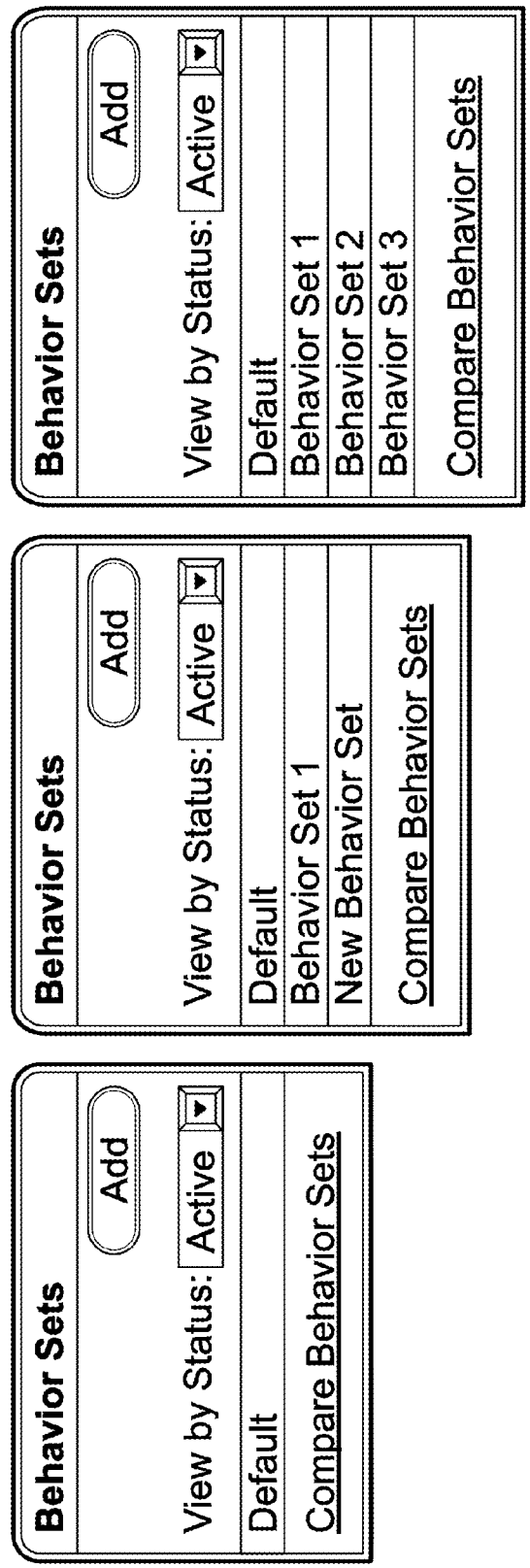
FIG. 11 is a screenshot of behavior sets viewed by a behavior set status.

FIG. 11 is a screenshot of behavior sets viewed by a behavior set status. Behavior sets list lists the process behavior sets configured for the expression. The behavior sets system allows the user to filter the behavior sets that display in the list maintain and in the compare grid by status. The behavior sets system populates the view by status with two values "Active"

and "Expired," and by default the value is set to "Active". When the user selects the "Add" button, the behavior sets system opens "Copy" lightbox and the UI refreshes the view by status page in add mode to configure the new process behavior sets. The view by status page supports the ability to limit the list maintain, preset scope items, field values, and the expiration and effective date values, as needed.

FIG. 12 is a screenshot of a behavior set field required by expression property. The expression name field appears when the user selects the 'By Expression' radio button. The behavior set system displays the expression display name as defined and passed in by an expression editor. The expression name is a hyperlink to the expression name page in expression editor. If no expression has been selected, the link may display as "Select Expression". Once an expression has been selected, the link may display as "Replace Expression". Similarly, a behavior set include a visible by reflexive property, where if a field has a behavior set whose scope items match exactly to the scope items defined for the field's reflexive settings and the field in context has already been configured as a child field, then the behavior set's visibility may be read-only selected to "By Reflexive" upon page load. The behavior set system may prompt the user to remove child field configurations before altering the behavior set's visibility settings.

FIG. 13 is a screenshot of behavior set field default value by condition properties. The user selects the "If True, Default Type" to describe the "True" condition outcome. The dropdown is populated with values based on the business data type (BDT). For number BDTs the following values may appear: 'No Default', 'Calculated Value', and 'Exact Value'. If the user selects 'Calculated Value,' the calculation section may appear below the dropdown. If the user selects 'Exact Value' a 'Value' text field may appear to the right of the dropdown. The user may select the same default type for both condition outcomes as long as the output values are unique. Field appears if user selects 'By Expression' radio button and 'Calculated Value' from the default outcome dropdown. The field displays the calculation name as defined and passed in by the expression editor. The calculation name is a link to the calculation's page in expression editor. If no calculation has been chosen, the link may display as 'Select Calculation'. Once a calculation has been selected, the link may display the 'Replace Calculation'. The 'else' default to field appears if the user selects 'By Expression' radio button and 'Calculated Value' from either 'Default Type' dropdown, the field appears as a disabled field. The behavior set system displays the calculation description as defined and passed in by expression editor, but may appear blank if no value has been defined. The dropdown is populated with values based on the business data type. For number BDTs the following values may appear: 'No Default', 'Calculated Value', and 'Exact Value'. If the user selects 'Calculated Value,' the calculation section may appear below the dropdown. If the user selects 'Exact Value' a 'Value' text field may appear to the right of the dropdown. The user may select the same Default Type for both expression outcomes as long as the output values are unique else a contention error may occur. User selects an execution point for the expression and if applicable, the calculation. The 'execute upon' field appears if user selects 'By Expression' radio button. The 'execute upon' field is populated with the following values: 'Page Load', 'Page Load and Field Exit.' Field appears when the user selects 'By Expression' radio button. The user may enter the exact numeric default value for a field rather than calculate the value. If the user selects the "Always" radio button in the Default Value section, the "Default Value" dropdown appears below the radio button for the user to select the valid value default Value they want to appear in the field at runtime for this specific scope. The dropdown's values are populated with the valid values as defined in the values section for this specific scope. For applicable numeric BDTs, the user selects the default type from the following values: 'Calculated Value' and 'Exact Value'. If the user selects 'Calculated Value' the calculation section may appear below the 'Default Type' dropdown. If the user selects 'Exact Value' a 'Value' text field may appear to the right of the 'Default Type' dropdown.

Figure 14:
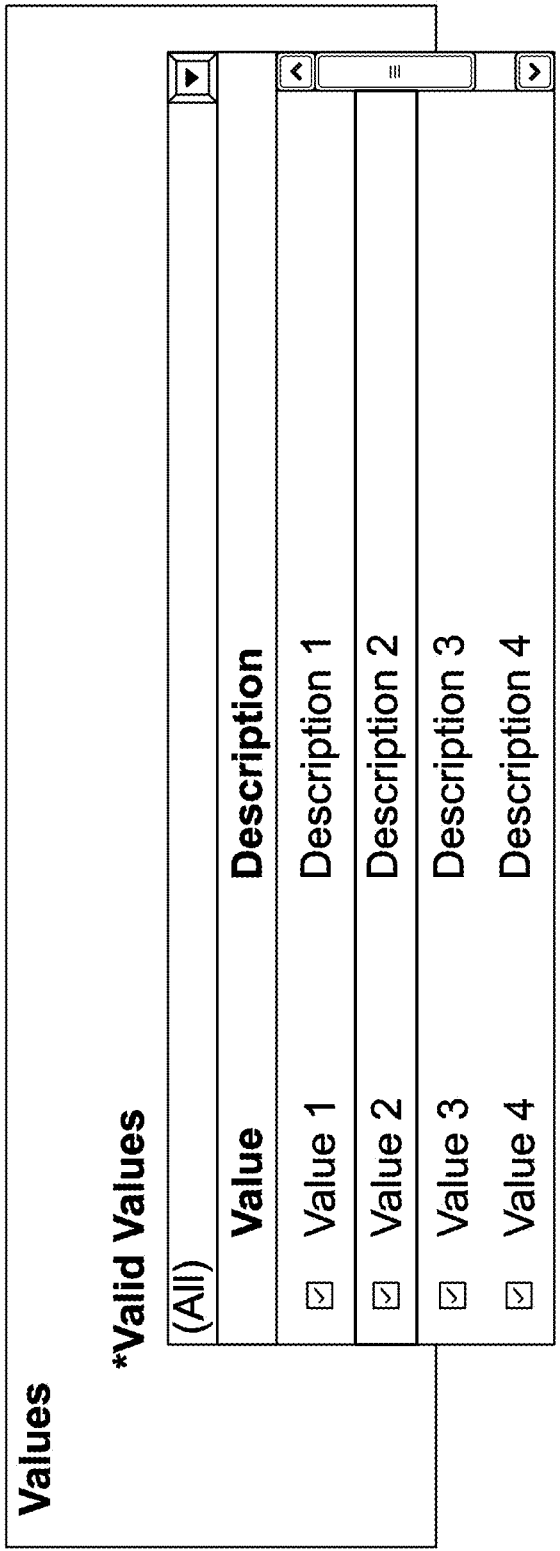
FIG. 14 is a screenshot of behavior set field values.

FIG. 14 is a screenshot of behavior set field values. Valid values listbox appears as a multiple select dropdown and is populated with the values as defined in the data dictionary. When the user opens dropdown, the table view with checkboxes appears where they can select and unselect options. Once the table view closes, the dropdown may populate with the chosen values. For the initial behavior set 'ALL Valid Values' as defined and passed in by the data dictionary are selected in the listbox. Valid values listbox opens and floats over other screen details such as the default value section. The dropdown shows the value and description of each category item.

Figure 15:
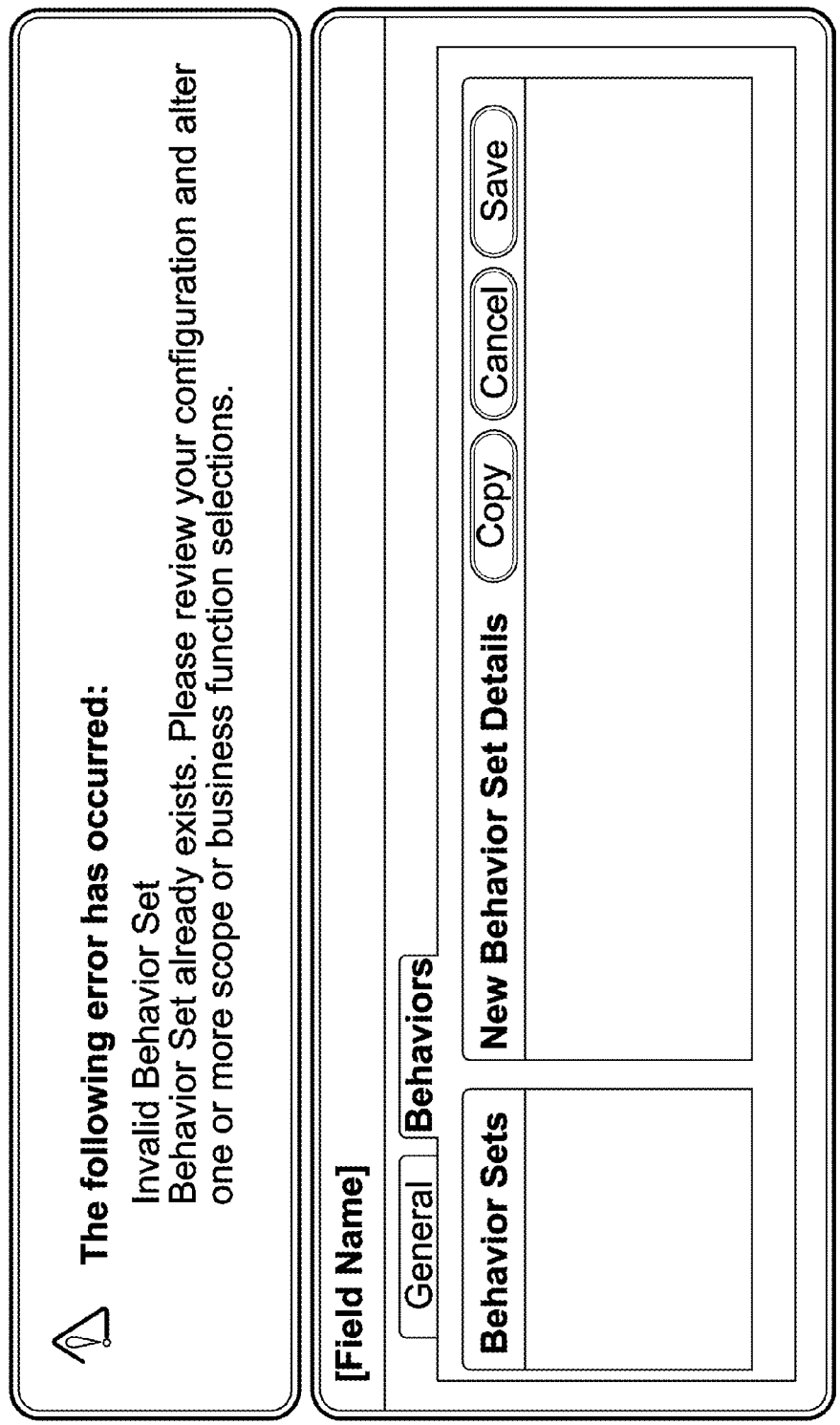
FIG. 15 is a screenshot of an invalid behavior set message.

FIG. 15 is a screenshot of an invalid behavior set message. The behavior set system may prompt the user with an error message indicating an attempt to create an invalid behavior set because the behavior set already exists.

Figure 16:
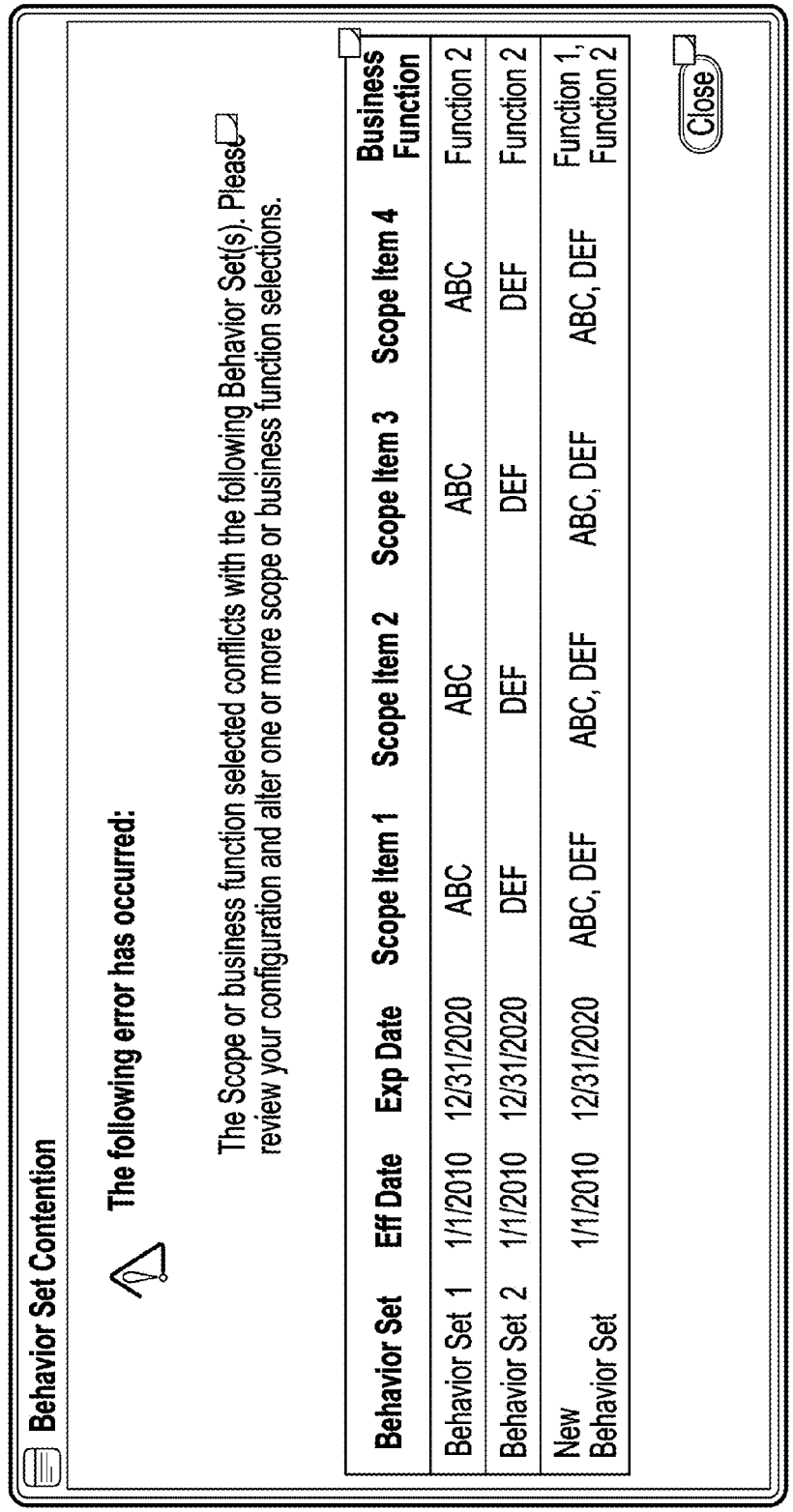
FIG. 16 is a screenshot of a behavior set contention message.

FIG. 16 is a screenshot of a behavior set contention message. The behavior set system prompts the user with an error message indicating the scope or business function selected conflicts with a behavior set, presents the configuration and business functions to the user to review to alter to resolve the contention. After making configuration selections, the user may select to save the behavior set. The behavior set contention window appears if the user attempts to save a behavior set whose scope/business functions/dates incorrectly overlap. The contention compare grid may display the scope items visible on the UI. If a consuming application hides scope items on the behaviors tab then those hidden fields may not appear in the contention compare grid. If the behavior set in context has the exact same dates, scope and business functions as an existing behavior set then the contention message may appear as an on screen error message with the following text: "Invalid behavior set—behavior set already exists. Please review your configuration and alter one or more scope or business function selections." The error message may appear at the top of the screen as with like error messages and may not display the contention compare grid.

FIG. 17 is a screenshot of advance scope items, authority settings, and reflexive settings parameters. The following help text displays below the Authority Settings header: "Define Authority settings for the selected [Scope Item 1] and [Scope Item 2]." The text may display the scope items as passed in by the consuming application. The authority settings table displays the authority settings configured for the field (target object 214) in this context. The user is able to edit, add and remove Authority settings. Table row populates with user configured level, restricted values and message text once the user returns from the 'Authority Level Details' page. If the user selected 'Edit,' the data entered in the page may populate the corresponding row in the Advanced tab. If the user selects 'Add,' the entered data may create and populate a new row, the system reload current page to view "Authority Level Details" page and configure new Authority Setting, reload current page to view "Authority Level Details" page and edit settings for row record in context, and disables editing the data until a record exists. Table row record may be removed in context from the UI and database. The remove button is disabled until one record is present.

The following help text displays below the reflexive fields' settings header if the field is a parent, "Define Child field visibility settings for the selected [Scope Item 1] and [Scope Item 2]." The text may display the scope items as passed in by the consuming application. If the field is a child, the following text may appear, "Please refer to Parent field to configure Child field visibility settings for the selected [Scope Item 1] and [Scope Item 2]." The reflexive field settings table displays the reflexive fields' settings for the parent field in context. The user is able to edit, add, and remove parent settings alone. Child field settings are not subject to a table. The table row populates with user configured value and child fields once user returns from 'Reflexive Fields' lightbox. If the user selected 'Edit,' the data entered in the lightbox may populate the corresponding row in the advanced tab. If the user selected 'Add,' the entered data may create and populate a new row, and opens "Reflexive Field Settings" lightbox to configure new reflexive field setting.

The following help text displays for numeric BDTs below the competency settings header—"Select Operator format. All settings may follow the selected format." If the field is a valid value BDT then the following text may appear, "Define Competency Settings for the field." Displays for numeric BDTs, user may select the operator format to be used for the competency settings. The dropdown selection may determine how to load the competency setting lightbox as well as the validations needed for the settings. Populated with the possible values, "> or >=", "< or <=", and "Range". The dropdown may be disabled once a competency setting record has been saved. The competency settings table displays the competency settings configured for the field in this context. The user is able to edit, add and remove competency settings. Table row populates with user configured level, restricted values and message text once user returns from the competency settings lightbox. If the user selected 'Edit,' the data entered in the page may populate the corresponding row in the Advanced tab. If the user selected 'Add,' the entered data may create and populate a new row.

Competency refers to the ability of an end-user at runtime to override certain business behavior sets that normally would halt a transaction. For example, typically, an insurance company would not issue a policy to an applicant with multiple DWIs on their record, but if the end-user has an adequate competency level then s/he would be able to approve and issue the policy to said driver. If the user selects "Competency" then the "Restricted Level" dropdown may appear to the right of the "Edit Behavior" dropdown. The "Restricted Level" is populated with the same competency levels for the behavior set advanced competency settings. Competency level ascends with the numeric value, for example, level 10 is more senior and has more competency than level 1. The behavior set system may select the most senior level that is prohibited from overriding the competency behavior set. So if the user selects level 3, then that means levels 3, 2 and 1 may receive the behavior set system set error message at runtime, and levels 4 have enough competency to not receive an error. The behavior set system is prohibited from applying the competency edit behavior for the same scope items even if the restricted level and messages differ since one outcome can be defined per scope context.

The user selects the reflexive type for the field within the current context. The dropdown is populated with two options, "Parent" and "Child". If the user selects "Parent" then the Reflexive Settings table and buttons appear below the dropdown. If the user selects "Child" then two disabled fields may appear below the dropdown, "Parent Field" and "Parent Value". Once the user configures a row record, the dropdown is disabled until all row records are removed. If the consuming application passes in the field type then the dropdown may be populated with the appropriate type and disabled. The reflexive field settings table displays the reflexive fields' settings for the parent field in context. The user is able to edit, add, and remove parent settings alone. Child field settings are not subject to a table. Table row populates with user configured value and child fields once user returns from 'Reflexive Fields' lightbox. If the user selected 'Edit,' the data entered in the lightbox may populate the corresponding row in the Advanced tab. If the user selected 'Add,' the entered data may create and populate a new row, opens "Reflexive Field Settings" lightbox to configure new reflexive field setting, opens "Reflexive Field Settings" lightbox to edit settings for row record in context, but is disabled until a record exists. The system opens "Reflexive Field Settings" lightbox to edit settings for row record in context; disabled until a record exists.

If the reflexive field is a 'Parent' then 'Parent' may appear as a disabled dropdown. If the field is a 'Child' then 'Child' may appear as a disabled dropdown. The reflexive field Settings Table displays the reflexive fields settings for the parent field in context. The user is able to edit, add, and remove parent settings alone. Child field settings are not subject to a table. Table row populates with user configured value and child fields once user returns from 'Reflexive Fields' lightbox. If the user selected 'Edit,' the data entered in the lightbox may populate the corresponding row in the Advanced tab. If the user selected 'Add,' the entered data may create and populate a new row. Opens "Reflexive Field Settings" lightbox to configure new reflexive field setting. The calling application may pass in the parent field name driving the child field visibility as a disabled dropdown. If the parent field settings have not yet been configured the field may be blank. The calling application may pass in the Parent Value (and operator if applicable) driving the child field visibility as a disabled dropdown. If there is more than one value driving the behavior, the field may display the number of values within parentheses before listing the value names. If the parent field settings have not yet been configured the field may be left blank.

FIG. 18 is a screenshot of multiple behavior sets. The behavior set system displays the multiple behavior sets to the user to review.

Figure 19:
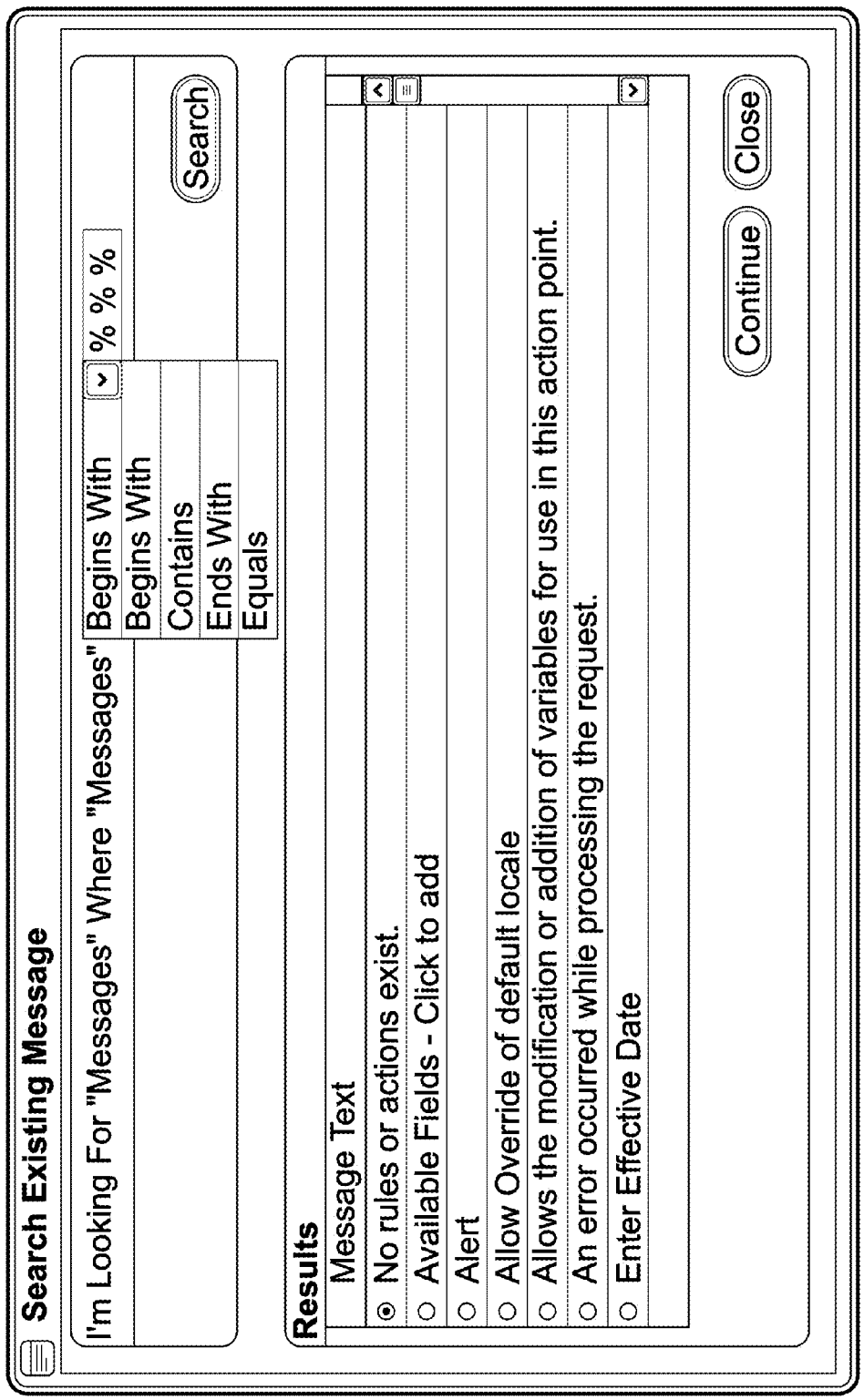
FIG. 19 is a screenshot of a search screen for searching existing behavior set messages.

FIG. 19 is a screenshot of a search screen for searching existing behavior set messages. The behavior set system allows the user to search existing messages useable to define the behavior set and particularly the messages used with particular resultant behaviors. If the behavior set system has elected to use an existing message for the competency level settings and clicked on the hyperlink, the message search lightbox may appear. The message search lightbox is the current lightbox being used by the consoles.

FIG. 20 is a screenshot of other advance reflexive settings parameters for a child field. The parent field name driving the child field visibility may appear as a disabled dropdown. If the parent field settings have not yet been configured the field may be blank. The parent value (and operator if applicable) driving the child field visibility may display as a disabled dropdown. If there is more than one value driving the behavior, the field may display the number of values within parentheses before listing the value names. If the parent field settings have not yet been configured the field may be left blank.

FIG. 21 is a screenshot of other reflexive settings parameters. The user selects the Field's Value driving the selected child field behavior. Dropdown is populated with the list of Valid Values as defined in the data dictionary for the field. user selects the child field(s) whose behavior is affected by the Parent Field Value in context. Dropdown is populated with the fields designated as child fields by the consuming application. May display child field that do not have a Parent. If a child field has already been selected by a Parent then that child field may not appear as a selectable value in the dropdown. The system saves data entered into UI into database and closes lightbox. Data saved in lightbox populates row record in Reflexive Field Settings table. If the user clicks 'Save' all field edits may be saved and the window may close. If the user selected 'Edit,' the entered data may populate the corresponding table row on the Advanced tab. If the user selected 'Add,' the entered data may create and populate a new row. user selects needed Operator. The dropdown is populated with the following values: >, >=, =<, <, and =. The user selects the child field(s) whose behavior is driven by the parent field value in context. The Dropdown is populated with the fields designated as child fields by the calling application. The link opens the message search lightbox where the user can search for and select the appropriate message. The chosen message text may populate the message text field. If no message has been selected, the link may display as "Select Existing Message". Once a message has been selected, the link may display as "Replace Selected Message", saves data into database and closes the lightbox. The data entered into the lightbox populates the corresponding table row in 'Edit' mode or creates a new row in 'Add' mode.

Figure 22:
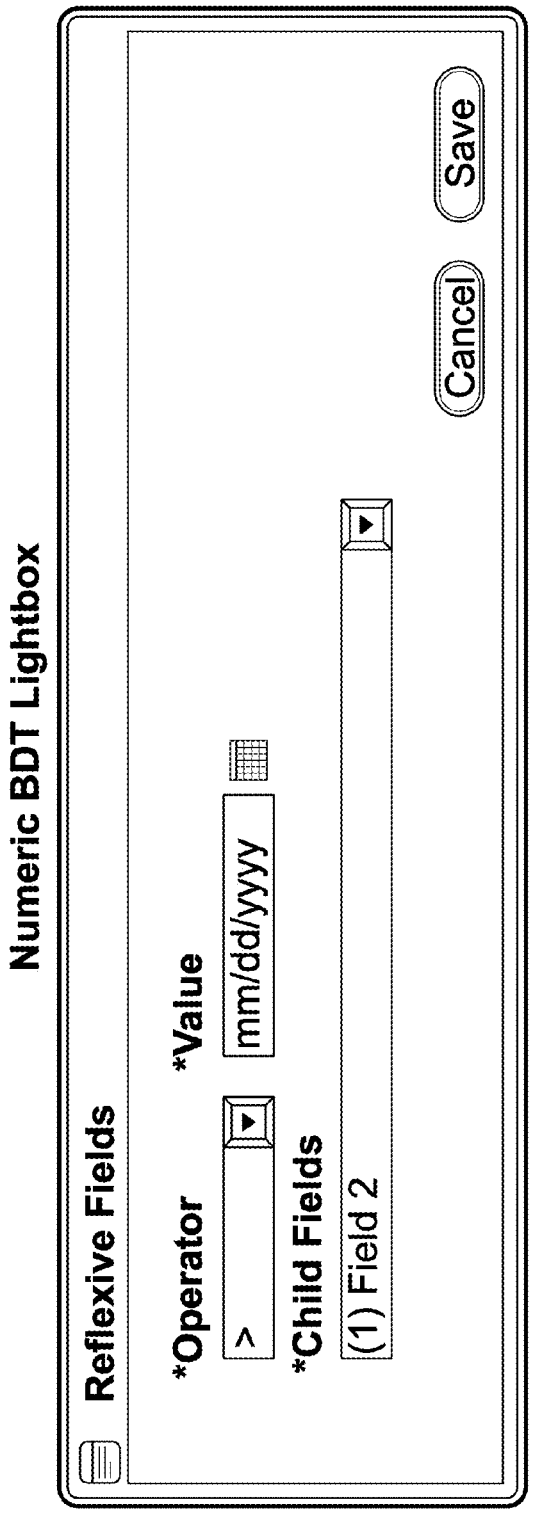
FIG. 22 is a screenshot of other reflexive settings parameters.

FIG. 22 is a screenshot of other reflexive settings parameters. The user selects the field's value driving the selected child field behavior. Dropdown is populated with the list of valid values designated in the field's values section. The user selects the child field(s) whose behavior is driven by the parent field value in context and Dropdown is populated with the Fields designated as child fields by the calling application.

Figure 23:
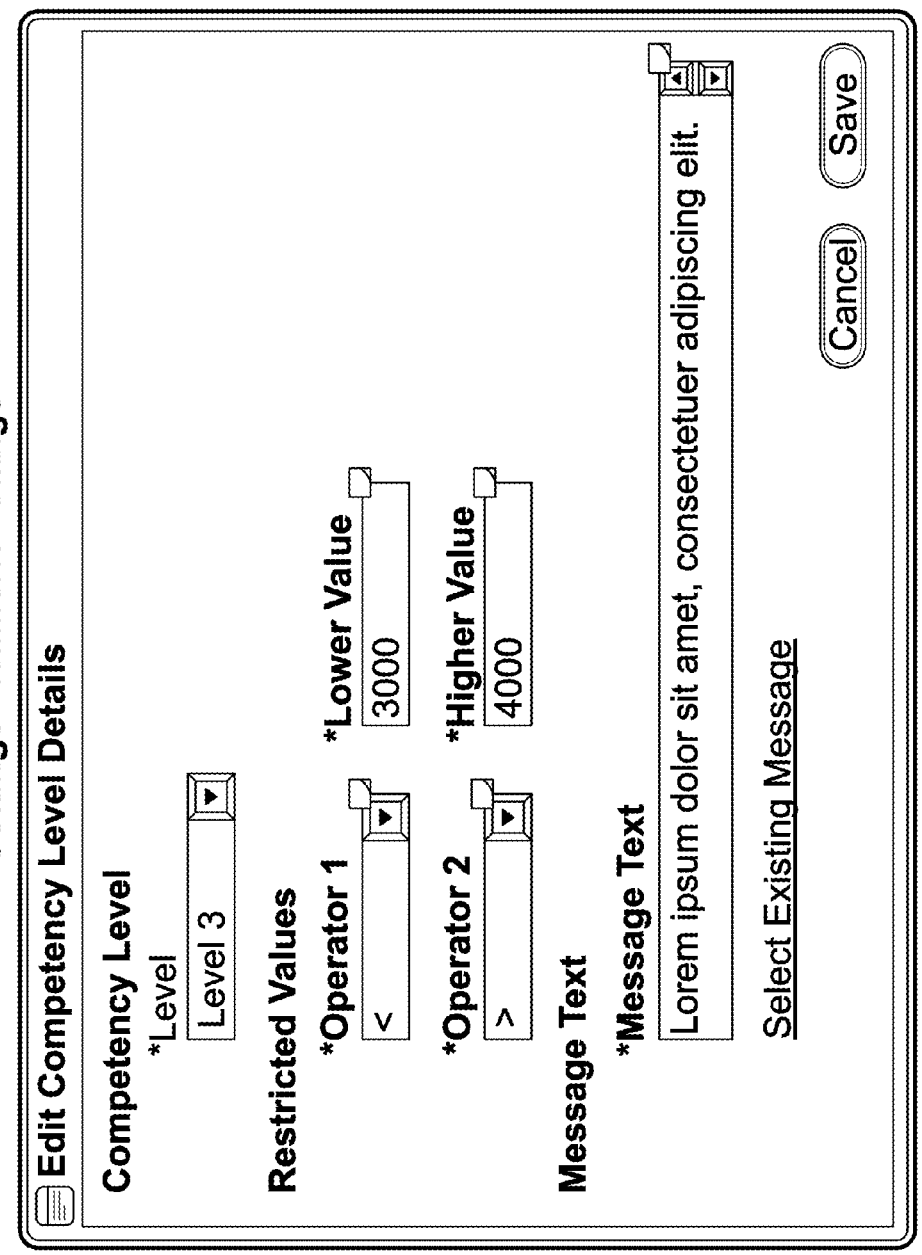
FIG. 23 is a screenshot of other behavior set edit competency level details parameters.

FIG. 23 is a screenshot of other behavior set edit competency level details parameters. The competency level the user is configuring is indicated that the user selects with operators. The dropdown is populated based on the operator(s) format. For example, If the operator format is ">or >=" then those are the possible dropdown selections. User enters the restricted value for the appropriate Competency Level. Values do not need to fall within the data dictionary range. The dropdown is populated with the following values: =< and <. The user enters the lower restricted value for the appropriate competency level. User selects needed operator. The dropdown is populated with the following values: > and >=. The user enters the higher restricted value for the appropriate Competency Level. The calling application may populate the Level dropdown with the appropriate End-User levels that the user can then configure. The select existing message link opens the Message Search lightbox where the user can search for and select the appropriate message. The chosen message text may populate the message text field. If no message has been selected, the link may display as "Select Existing Message". Once a message has been selected, the page may include a remove existing message link may display as "Replace Selected Message".

FIG. 24 is a screenshot of behavior set view by scope items parameters. The page accepts each Scope Item as well as the following items related to each Scope Item: value, visible settings and enabled settings. Allows user to select the applicable function category passed in by the consuming application. The selections chosen in this dropdown drive the options available in the business functions dropdown. Business functions are hard coded and specific to the consuming application, but the consuming application has the option to use the data items. If the consuming application chooses to use business functions as a scope item, they may always display at the bottom of the scope section. Allows user to select applicable business functions as defined by the function category dropdown selections and passed in by the calling application. Business functions are hard coded and specific to the consuming application, but the consuming application has the option to use the data items. If the consuming application chooses to use business functions as a scope item, they may always display at the bottom of the Scope section.

Figure 25:
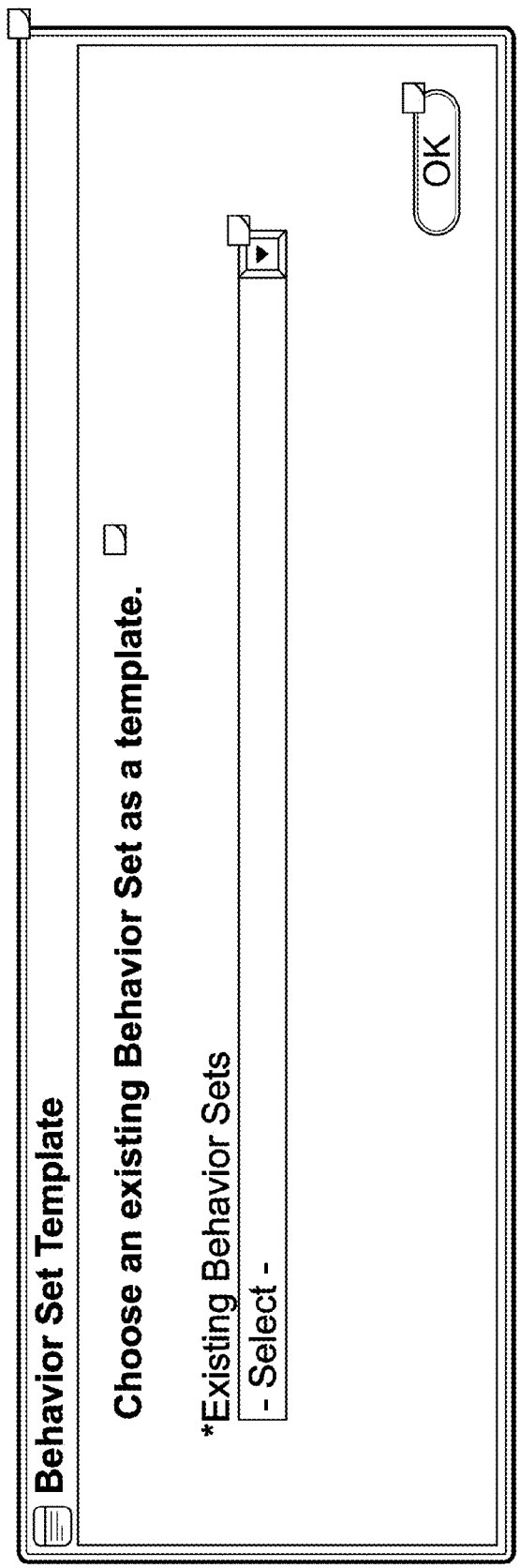
FIG. 25 is a screenshot of behavior set template.

FIG. 25 is a screenshot of behavior set template. When the user clicks "Add" the behavior set Template "Copy" lightbox opens. The user selects an existing behavior set from the dropdown whose configurations the user would like to use as a template for the new behavior set. The following help text may display at the top of the lightbox, "Choose an existing behavior set as a template." Dropdown is populated with the configured behavior sets listed in the Field's behavior set list maintain. Upon clicking the "OK" button, the lightbox may close and persist the selected behavior sets' configurations to the new.

Figure 26:
FIG. 26 is a screenshot of behavior set authority level details properties.

FIG. 26 is a screenshot of behavior set authority level details properties. Calling application populates the level dropdown with the appropriate end-user levels that the user can then configure. user selects needed operator. The dropdown is populated with the following values: >, >=, =<, <, =, and < >. User enters the restricted value for the appropriate authority level, and values must fall within field value range defined for set 1. The link opens the message search lightbox where the user can search for and select the appropriate message. The chosen message text may populate the message text field. If no message has been selected, the link may display as "Select Existing Message". Once a message has been selected, the link may display as "Replace Selected Message".

Figure 27:
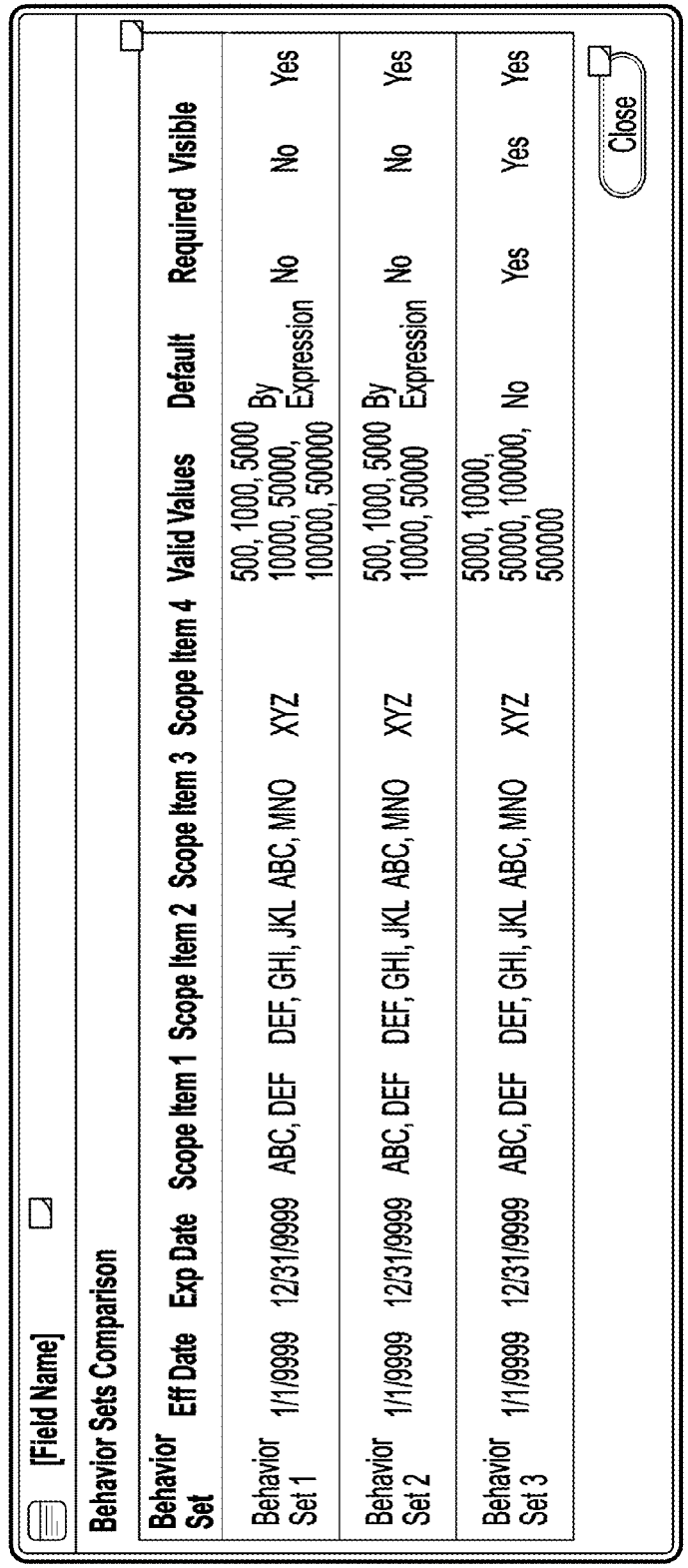
FIG. 27 is a screenshot of behavior sets settings comparison.

FIG. 27 is a screenshot of behavior sets settings comparison. Comparison table lists scope and property details for all configured behavior sets for the user to compare. Base properties may not display in lightbox. If no behavior sets have been configured the lightbox may display the following read-only text, "No behavior sets have been added."

Figure 28:
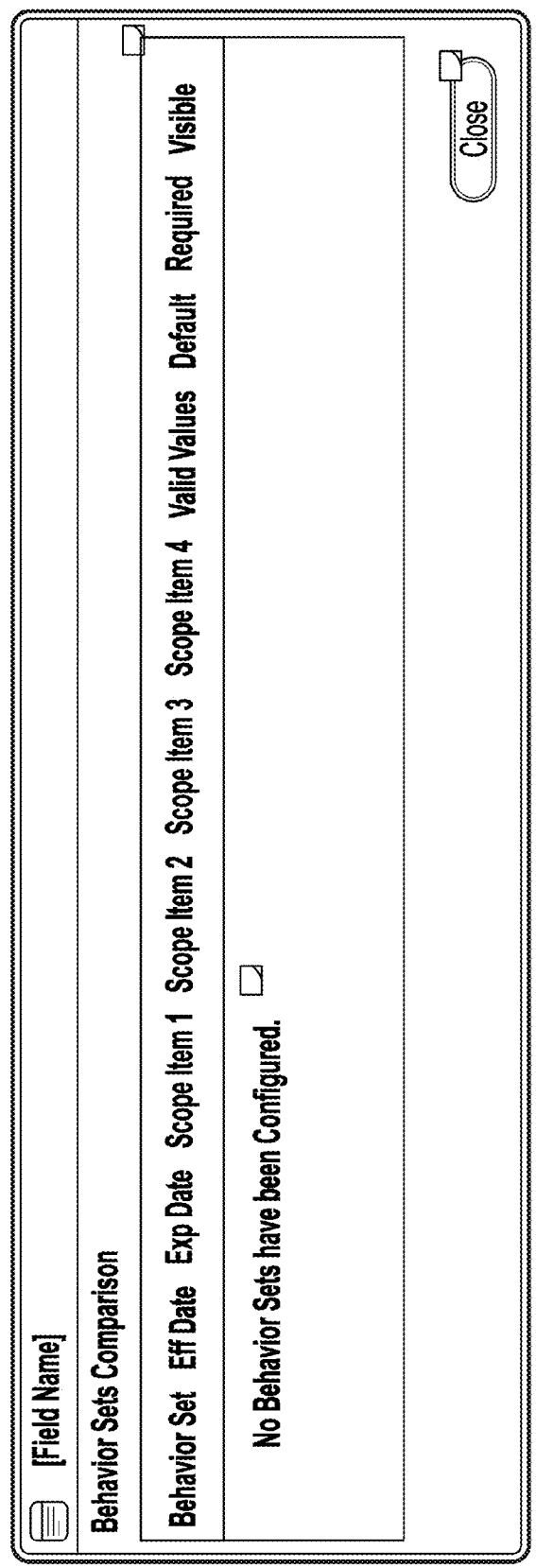
FIG. 28 is a screenshot of another behavior sets comparison where no behavior sets have been configured.

FIG. 28 is a screenshot of another behavior sets comparison where no behavior sets have been configured.

FIG. 29 is a screenshot of behavior sets details and outcomes parameters for rules. The behavior set system may pre-populate configurations with the selections of the behavior set in context. The [behavior set name] header may initially populate with "New behavior set" until the User-created name is saved. Once the name is saved, the header may update to "[behavior set name]". To create the behavior set name, the user enters a name in the behavior set name field, and prompts contention checks. Once behavior set clears contention checks, the behavior set system saves data entered into fields and reloads the page in "Edit" mode. Once settings are saved, the list may be updated with the new behavior set name. The "Details" panel header may also update with the new name. When the page loads for the initial behavior set the date field is populated with the applicable date as passed in by the consuming application. If the Application does not pass in a value, the field may default to the data dictionary effective date. The date is editable to the user, but the date may not fall outside the date range as defined in the data dictionary. The effective date may be configured to be prior to the expiration date or else a validation error may occur.

The system allows the user to select the applicable function category passed in by the consuming application. The selections chosen in this dropdown drive the options available in the business functions dropdown. Business functions are table driven values specific to the consuming application, and the consuming application has the option to use the data items. The behavior set system is required to specify the expression's business function(s). The behavior set system selects the expression's corresponding edit behavior (outcome). The user is able to select from the following edit behavior values: Knockout, Competency, Follow-up Activities, Data Validation: Hard Edit/Stop, Data Validation: Hard Edit/Proceed and Warning/Notification. If the behavior set system selects "Competency" then the "Restricted Level" dropdown may appear to the right of the dropdown. The user inputs the message that may display to the end-user based on the behavior set Edit behavior outcome. Prompts validation checks. Once behavior set clears validation checks, the system saves data entered into the fields and reloads the page in "Edit" mode. Once settings are saved the list maintain within the behavior set list may update the list with the new behavior set name. The "Details" panel header may also update with the new name. The behavior set system selects one Edit behavior to add to the expression to create the behavior set outcome. The behavior set system is able to select one of multiple possible outcomes per scope: Competency, Follow-Up Activities, Warning/Notification, Data Validation: Hard Edit/Proceed, Data Validation: Hard Edit/Stop and Knockout. The outcome section allows the behavior set system to make a behavior set by adding an outcome (Edit Behavior) for the expression. The user may configure one outcome for the expression per scope context. "Follow-up activities" refers to the consuming application at runtime creating a type of "reminder" or "task" when the behavior set is executed. For example, an agent requires a proof of residency within 30 days of issuing a policy to an applicant. If an agent approves and issues a policy without first having proof of residency, then the agent would have a task to follow-up and verify that they have received the proof of residency within the required time limit.

The Warning/Notification refers to the consuming application displaying a message to the End-User at runtime when the behavior set is executed. For example, an agent is in the process of issuing a policy to a homeowner who lives in an earthquake zone. When the agent notes that the homeowner lives in such a region, the system may display a message to the agent warning them that additional coverage is required in order to issue the policy. Hard Edit/Proceed refers to the consuming application allowing the End-User to proceed but not complete their business transaction despite having a field error. Example: A field accepts values from 1 to 25, but the agent entered 26. The Agent may proceed to the next page but cannot issue a policy without correcting the field error. Hard Edit/Stop refers to the consuming application prohibiting the End-User from proceeding from a page without rectifying the field errors. Example: A field accepts values from 1 to 25, but the Agent entered 26. The Agent may not proceed to the next page without correcting the field error. Knockout refers to the ability of the consuming application to stop a business transaction based on a behavior set. Example: An Insurance company has a strict no-issue policy regarding applicants with multiple DWIs on their record. If an Agent marks down that the applicant has multiple DWIs the system prohibits s/he and any others from issuing the policy.

FIG. 30 is a screenshot of other behavior sets settings comparison. The user may use the behavior sets settings comparison to efficiently and effectively manage policy and claims processing.

Figure 31:
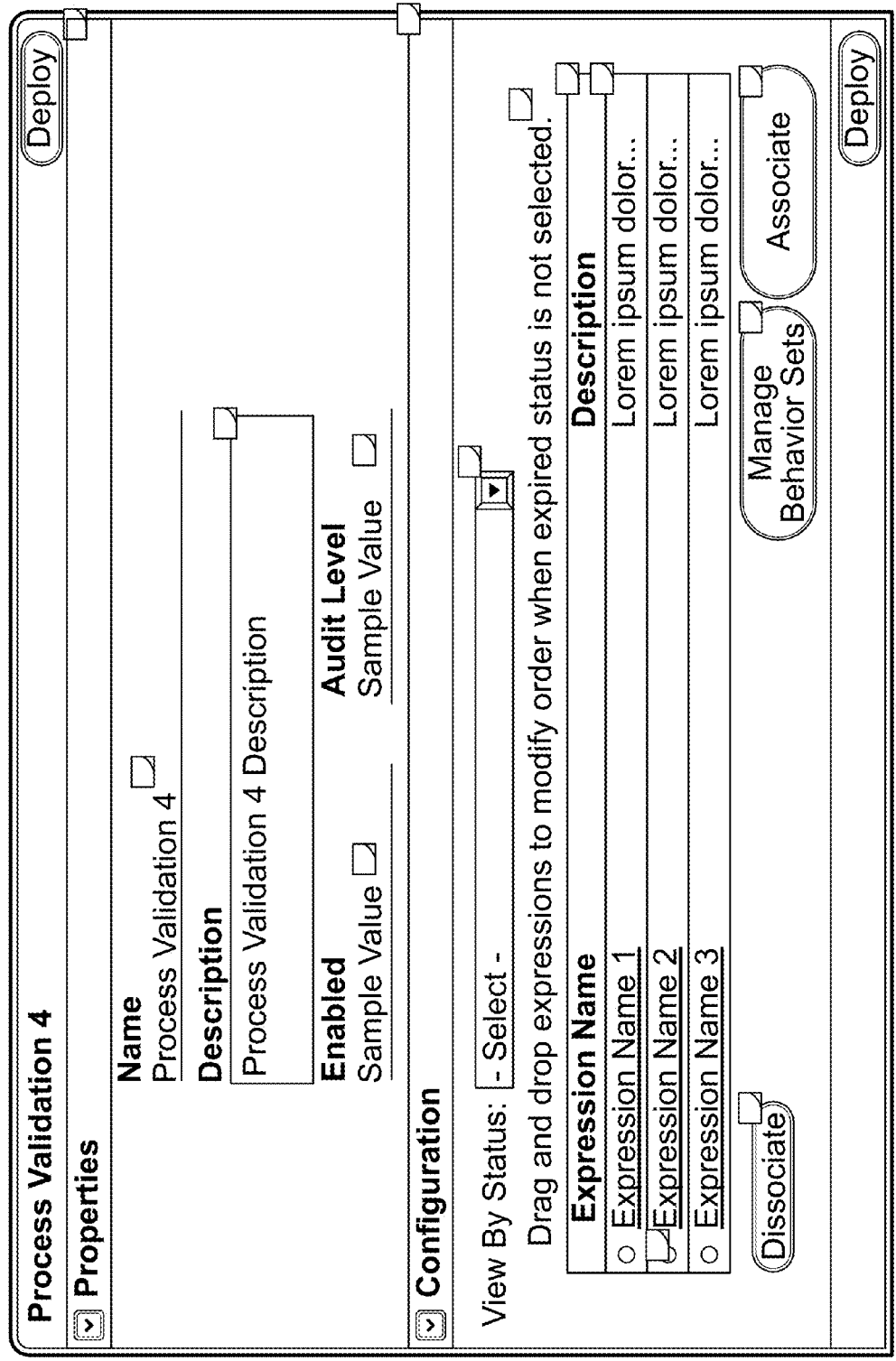
FIG. 31 is a screenshot of behavior set process validation properties and configuration parameters.

FIG. 31 is a screenshot of behavior set process validation properties and configuration parameters. The behavior set system displays the process validation name as a disabled, read-only field. The user may filter the expressions to view by Status. The dropdown has the following values: Active, Active and Pending, Expired, and Pending. The selection made in this dropdown determines the expressions displayed. The following help text displays below the status dropdown, "Drag and drop behavior set to modify order when expired status is not selected." The Table displays the expression name and description associated to the process validation. The table record displays the expression name as a hyperlink to that expression's details in expression editor and the expression description as defined in expression editor denotes the table row is in context and subject to "Manage behavior sets" and "Remove Expression" buttons. If user clicks on the "Add Expression" button, the user may be directed to the expression editor landing page. Removes expression's association from the process validation and clears from table. Removes the selected expression's association from the process validation and clears record from table. Opens lightbox for the user to select process behavior set context and navigates user to process behavior sets page. If user clicks on the button, the user may be prompted to select the context in which to view the selected row record and may be navigated to the process behavior sets page within that selected context.

An Expression effectively becomes a Rule once a behavior set and behavior set outcome is saved. The behavior sets for Rules page allows a user to configure a behavior set for consoles expressions and rule sets that reside in a third party rules engine within the context of a consuming application. A behavior set is a group of scope and outcome configurations that determine how an expression executes for a specific scope at application runtime. Behavior sets for rules are comprised of the following properties: effective date, expiration date, outcomes, business function and scope (business functions and scope items are specific to the consuming application).

For rules, the behavior set page is comprised of the behavior set list and is divided into three main configuration sections: Details, Scope and Outcomes. To access the behavior set for rules landing page the user navigates from the consuming application since there is no entry point from the consoles. If no behavior sets exist for the Expression within a specific context, the behavior sets page may load in "Add" mode for a "New behavior set." If behavior sets exist within the same context for the expression then the page may load in "Edit" for the topmost behavior set appearing in the list maintain. Behavior sets may not have a default configuration set.

The page supports the ability to accept the consuming application's "View Type" (preset scope items applicable to the Consuming App), limit the list maintain and define the expiration and effective date values, as needed. The page also accepts the following items related to each Scope Item: Values (dropdown selections), Visible settings, and Enabled settings. The user may then edit these prefilled configuration selections.

The 'Copy' button may reload the page in "Add" mode using the current behavior set's configurations to pre-populate the screen of the new behavior set. The 'Copy' button may not be enabled in "Add" mode until the record in context is saved, but is enabled in "Edit" and "View" modes. Consequently, the user cannot use copy until the new behavior set is saved. If the user attempts to copy without first saving the configurations s/he may receive an error message. A user also has the ability to copy an expired behavior set. If the user copies an expired behavior set the past dates may pre-populate the new behavior set's date fields, but are editable.

The 'Cancel' button clears any unsaved data from fields and reloads the UI as it was previously loaded, i.e. either default page selections or as a saved configuration. If the user makes any changes to a previously saved configuration without saving again then clicks cancel, the page may reload to display the saved configuration.

The 'Save' button prompts the system to run validation checks before saving the data entered into the fields and reloading the page in "Edit" mode. Once the behavior set is clear of any errors the data is saved, the page loads in "Edit" mode, the behavior set name in the list maintain and panel header update to the user-created name.

Until the behavior set is saved, the user may not navigate to another page unless the user is willing to lose the work or clicks "Cancel" to clear the work from the fields. Once the configurations for the behavior set are complete the user may click "Save," prompting the behavior set system to perform validation check on the entered information. The effective and expiration dates must be within the expression's data dictionary range as well as the consuming application's passed-in date range. The behavior set system also validates that the behavior set configuration as a whole is not in contention with any other behavior set configured within the same context. The consoles contention logic may follow a provider model where either behavior set logic or the consuming application's logic may be used.

If a validation error occurs, the behavior set system may receive a hard edit and may not be allowed to save the data until the error has been fixed. If the configuration in context is an exact match of an existing behavior set then the contention message may appear as on-screen error. A behavior set configuration with overlapping scope/business functions/dates may cause a contention overlay to be displayed. If no validation errors exist, the entered data may be saved and remain in the fields for the user to view and/or edit. More information regarding the page's validations can be found in Validations.xlsx.

Once the behavior set is clear of validation errors, the user may configure additional behavior sets for the expression or return to the consuming application. If the user wishes to use the current behavior set's configurations as a template for a new behavior set, the user may click "Copy" to have the UI reload in "Add" mode with the configurations pre-populating the fields. If the user does not wish to use any previous configurations as a template they may click "Add" and prompt the UI to refresh in "Add" mode to configure the new behavior set.

The behavior sets List displays to the user in a list maintain format the behavior sets configured for the expression. The consuming application has the ability to limit the list to display either the behavior sets in context or to display all of the behavior sets configured for the expression across all contexts. The behavior set system may also further limit the list by behavior set status, "Expired" or "Active." If the behavior set system selects "Active" then the active behavior sets within the predefined context may display in the list. If the behavior set system selects "Expired" then the expired behavior sets within the predefined context may display in the list. As each behavior set is saved the User-created name for the behavior set may populate the behavior set List, replacing the text "new behavior set." When the behavior set system clicks "Add," "new behavior set" may appear as the bottommost list item. If behavior sets exist when the page launches then the first record in the list may be selected and in "Edit" mode. To compare the configured behavior sets, the user may click on the "compare behavior sets" link to view the behavior set comparison table. The behavior set comparison table opens as a new window.

If the consuming application does not wish to limit the list by context then all of the behavior sets configured for the expression may appear in the list. Upon page load, the first record may be highlighted and the page may load in "Edit" mode for that record. Assuming no other behavior sets have been configured for the expression then "new behavior set" may appear as the list item in view when the page loads and may be in "Add" mode. If the consuming application wishes to limit the list by context, then the behavior sets falling within the same context may be displayed. Upon page load the first record within that context may be highlighted and the page may load in "Edit" mode for that record. Assuming no other behavior sets have been configured for the Expression then "new behavior set" may appear as the list item in view when the page loads and may be in "Add" mode. The consuming application has the ability to pass in the applicable Business Functions. If the Application chooses to pass in the values, then the Function Category field may not appear in the Details section. The consuming application has the option to alter each scope Item's dropdown editable and visibility properties, i.e. the consuming application may determine whether or not the dropdown is enabled versus disabled and either visible or hidden. Upon initial page load, each dropdown should be defaulted to "All" unless a specific data Item has been passed and until the user alters and saves a possible scope selection.

The behavior sets compare grid table opens in a new window. The table is in read-only format and displays the behavior sets for the Expression as defined in the list maintain, so that if the list maintain has been limited the records displayed in that list may appear in the compare grid. The table can display the behavior set name, effective date, expiration date and each scope item. The comparison grid may display the scope items that are visible on the UI. If a behavior set system selects "All" in one of the scope item dropdowns then the grid should display "All." If a property is subject to an expression, then "By Expression" may display in the table. If no behavior sets are in the list maintain then, "No behavior sets have been added." may appear in the lightbox, and the scroll bar may not always appear. Scrolling may be enabled when the content extends past the allowed width.

In a networked deployment, the behavior sets system (e.g., computer system) may operate in the capacity of a server or as a client user computer in a server-client user network environment, or as a peer computer system in a peer-to-peer (or distributed) network environment. The computer system may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system may be implemented using electronic devices that provide voice, video or data communication. Further, while a single computer system may be illustrated, the term "system" shall also be taken to include any collection of systems or sub-systems that individually or jointly execute a set, or multiple sets, of instructions to perform one or more computer functions.

The computer system may include a memory that can communicate via a bus. The memory may be a main memory, a static memory, or a dynamic memory. The memory may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory may include a cache or random access memory for the processor. Alternatively or in addition, the memory may be separate from the processor, such as a cache memory of a processor, the system memory, or other memory. The memory may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system may further include a display, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the computer system may include an input device configured to allow a user to interact with any of the components of system. The input device may be a number pad, a keyboard, or a cursor control device, such as a mouse, or a joystick, touch screen display, remote control or any other device operative to interact with the system.

The computer system may also include a disk or optical drive unit. The disk drive unit may include a computer-readable medium in which one or more sets of instructions, e.g. software, can be embedded. Further, the instructions may perform one or more of the methods or logic as described herein. The instructions may reside completely, or at least partially, within the memory and/or within the processor during execution by the computer system. The memory and the processor also may include computer-readable media as discussed above.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system 2400, or combinations thereof. The connection with the network may be a physical connection, such as a wired Ethernet connection or may be established wirelessly as discussed below. Likewise, the additional connections with other components of the system may be physical connections or may be established wirelessly. In the case of a service provider server, the service provider server may communicate with users through the communication interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A method for generating behavior sets services responsive to multiple user interfaces, the method comprising:
   identifying a target object defined for multiple different target interfaces, for which to generate one or more behavior sets, including a first behavior set for the target object comprising a first behavior and a second behavior;
   defining, in a behavior sets system, a first behavior set scope for the first behavior set for the target object, the first behavior set scope comprising definitions for behaviors for elements, fields, and rules in the multiple different target interfaces based on triggers for the elements, the fields, and the rules, wherein the triggers comprise field triggers and rule triggers, and the field triggers are associated with a product structure scope and the rule triggers are associated with a runtime scope, and wherein the one or more behavior sets comprise outcomes that determine how the one or more behavior sets execute at application runtime;
   determining whether the first behavior set scope matches at least a portion of an existing behavior set scope for the first behavior set for the target object or whether the first behavior set scope is an unique first behavior set for the target object, wherein:
      when the first behavior set scope matches the at least the portion of the existing behavior set scope, defining in the behavior sets system a second behavior set scope for the first behavior set for the target object; and
      when the first behavior set scope is the unique first behavior set for the target object, defining in the behavior sets system the first behavior and the second behavior for the target object as resulting behaviors of the first behavior set scope, comprising by:
         generating, using the behavior sets system, a behavior sets service comprising the one or more behavior sets, including the first behavior set, wherein the behavior sets service is independent of the multiple different target interfaces and accessible by the multiple different target interfaces, and provides the first behavior and the second behavior for the target object for use by the multiple different target interfaces; and
   communicating the behavior sets service to the multiple different target interfaces.

2. The method of claim 1, wherein the multiple different target interfaces are different user interfaces issuing the same transaction, wherein the multiple different target interfaces are consuming application user interfaces, and wherein the multiple different target interfaces correspond to multiple different channels including: direct, agency, home office, and mobile.

3. The method of claim 1, the method further comprising generating a comparison between the behavior sets, and displaying the comparison in a graphical display.

4. The method of claim 1, further comprising: validating that the behavior sets in combination are compatible with each other logically, and operationally compatible with authorized protocol, including: the multiple different target interfaces.

5. The method of claim 1, wherein the behavior sets service comprises the one or more behavior sets including the first behavior set and a second behavior set.

6. The method of claim 5, wherein the behavior sets, including the first behavior set and the second behavior set, comprise: behavior set, a behavior set, and behavior set properties.

7. The method of claim 6, wherein the behavior set scope of each behavior set defines behaviors for elements, fields, and rules in the multiple different target interfaces based on the triggers for the elements, the fields, and the rules.

8. The method of claim 1, wherein multiple different target systems comprise the multiple different target interfaces in communication with the behavior sets service using a network.

9. The method of claim 6, wherein the behavior set scope includes: the product structure scope, the run-time scope, scope items, a function category, and a business, state, product, subject of insurance, transaction, and business function.

10. The method of claim 8, wherein the method further comprises generating the behavior sets service to include runtime selection logic operable to determine the behavior set to apply to the multiple different target interfaces based on a priority of the behavior set.

11. The method of claim 9, wherein the product structure scope comprises: a product description; a subject of insurance, and coverage.

12. The method of claim 9, wherein the runtime scope comprises: a transaction, state/province, and a channel.

13. The method of claim 7, wherein the field triggers comprise: a page load, and field exit.

14. The method of claim 7, wherein the behavior set properties include: enable/disable, required/not required, default value, visible/not visible, and editable/not editable.

15. The method of claim 7, wherein the field behaviors comprise: always, never, and by expression; wherein the visibility field behavior further comprises: by reflexive.

16. The method of claim 7, wherein the rule triggers comprise: save quote detail, and save claim action.

17. The method of claim 7, wherein the rule behaviors comprise: a knockout rule behavior, a hardstop rule behavior, a warning rule behavior, and an authorization rule behavior.

18. The method of claim 6, wherein the behavior set properties are selectable based on the behavior set scope.

19. The method of claim 6, wherein the behavior set properties further include: values comprising: a unit of money indicator, a minimum value, and a maximum value.

20. The method of claim 14, wherein default values for fields comprise: numeric properties, and visible properties.

21. The method of claim 20, wherein the numeric properties include:
an initial page load—data items passed in;
data items passed in; no data items passed in;
no default—no data items passed in;
prompts by expression;
default value—by expression; and
default value—always.

22. A system for generating behavior sets services responsive to multiple user interfaces, the system comprising:
a memory coupled to a processor, the memory comprising:
behavior sets instructions executable by the processor that when executed by the processor cause the processor to:
identify a target object defined for multiple different target interfaces, for which to generate one or more behavior sets, including a first behavior set comprising a first behavior and a second behavior;
define, in a behavior sets system, a first behavior set scope for the first behavior set for the target object, the first behavior set scope comprising definitions for behaviors for elements, fields, and rules in the multiple different target interfaces based on triggers for the elements, the fields, and the rules, wherein the triggers comprise field triggers and rule triggers and the field triggers are associated with a product structure scope and the rule triggers are associated with a runtime scope, and wherein the one or more behavior sets comprise outcomes that determine how the one or more behavior sets execute at application runtime;
determine whether the first behavior set scope matches at least a portion of an existing behavior set scope for the first behavior set for the target object or whether the first behavior set scope is an unique first behavior set for the target object, wherein:
when the first behavior set scope matches the at least the portion of the existing behavior set scope, define, in the behavior sets system a second behavior set scope for the first behavior set for the target object; and
when the first behavior set scope is the unique first behavior set for the target object, define in the behavior sets system the first behavior and the second behavior for the target object, by:
generating, using the behavior sets system, a behavior sets service comprising the one or more behavior sets, including the first behavior set, wherein the behavior sets service is independent of the multiple different target interfaces and accessible by the multiple different target interfaces, and provides the first behavior and the second behavior for the target object for use by the multiple different target interfaces; and
a communications interface configured to communicate the behavior sets service to the multiple different target interfaces, via a network.

23. The system of claim 22, wherein the multiple different target interfaces are different user interfaces processing the same or similar transactions.

24. The system of claim 22, the method further comprising generating a comparison between the behavior sets; and displaying the comparison in a graphical display.

25. The system of claim 22, wherein analyzing comprises: determining that the behavior sets in combination are compatible with each other logically, and operationally compatible with authorized protocol, including: the multiple different target interfaces.

26. The system of claim 22, wherein the behavior sets service comprises the one or more behavior sets including the first behavior set and a second behavior set.

27. The system of claim 22, wherein the behavior sets comprise: behavior set details, a behavior set scope and behavior set properties.

28. The system of claim 27, wherein the behavior set scope of each behavior set defines behaviors for elements, fields, and rules in the multiple different target interfaces based on the triggers for the elements, the fields, and the rules.

29. The system of claim 27, wherein multiple different target systems comprise the multiple different target interfaces in communication with the behavior sets service using the network.

30. The system of claim 27, wherein the behavior set scope includes: the product structure scope, the run-time scope; scope items, a function category, a business function, state, product, line of business, subject of insurance, transaction, and business function.

31. The system of claim 28, wherein the product structure scope comprises: a product description, a subject of insurance, coverage, sub-coverage, and line of business.

32. The system of claim 28, wherein the run-time scope comprises: a transaction, a state/province, and a channel, wherein the channel is from a group comprising: agent, home office, direct, call center.

33. The system of claim 27, wherein the field triggers comprise: a page load, and field exit.

34. The system of claim 25, wherein the behavior set properties include: enable/disable, required/not required, default value, visible/not visible, and editable/not editable.

35. The system of claim 28, wherein the rule behaviors comprise: a knockout rule behavior, a hardstop rule behavior, a warning rule behavior, and an authorization rule behavior.

36. The system of claim 27, wherein the behavior set properties are selectable based on the behavior set scope.

37. A non-transitory computer readable medium comprising:
behavior sets logic, when executed by a processor coupled to a memory, cause the processor to:
identify a target object defined for multiple different target interfaces, for which to generate one or more behavior sets, including a first behavior set comprising a first behavior and a second behavior;
define, in a behavior sets system, a first behavior set scope for the first behavior set for the target object, the first behavior set scope comprising definitions for behaviors for elements, fields, and rules in the multiple different target interfaces based on triggers for the elements, the fields, and the rules, wherein the triggers comprise field triggers and rule triggers and the field triggers are associated with a product structure scope and the rule triggers are associated with a runtime scope, and wherein the one or more behavior sets comprise outcomes that determine how the one or more behavior sets execute at application runtime;
determine whether the first behavior set scope matches at least a portion of an existing behavior set scope for the first behavior set for the target object or whether the first behavior set scope is an unique first behavior sets for the target object, wherein:

when the first behavior set scope matches the at least the portion of the existing behavior set scope, define in the behavior sets system a second behavior set scope for the first behavior set for the target object; and when the first behavior set scope is the unique first behavior set for the target object, define in the behavior sets system the first behavior and the second behavior for the target object, by:

generating, using the behavior sets system, a behavior sets service comprising the one or more behavior sets, including the first behavior set, wherein the behavior sets service is independent of the multiple different target interfaces and accessible by the multiple different target interfaces, and provides the first behavior and the second behavior for the target object for use by the multiple different target interfaces; and a communications interface configured to communicate the behavior sets service to the multiple different target interfaces, via a network.

38. The non-transitory computer readable medium of claim 37, wherein the multiple different target interfaces are different user interfaces issuing the same or similar transactions.

39. The non-transitory computer readable medium of claim 37, the method further comprising generating a comparison between the behavior sets; and displaying the comparison in a graphical display.

40. The non-transitory computer readable medium of claim 37, wherein analyzing comprises: determining that the behavior sets in combination are compatible with each other logically, and operationally compatible with authorized protocol, including: the multiple different target interfaces.

41. The non-transitory computer readable medium of claim 37, wherein the behavior sets service comprises the one or more behavior sets including the first behavior set and a second behavior set.

42. The non-transitory computer readable medium of claim 37, wherein the first behavior set and a second behavior set comprise: behavior set details, a behavior set scope, and behavior set properties.

43. The non-transitory computer readable medium of claim 42, wherein the behavior set scope of each behavior set defines behaviors for elements, fields, and rules in the multiple different target interfaces based on the triggers for the elements, the fields, and the rules.

44. The non-transitory computer readable medium of claim 37, wherein multiple different target systems comprise the multiple different target interfaces in communication with the behavior sets service using the network.

45. The non-transitory computer readable medium of claim 42, wherein the behavior set scope includes: the product structure scope, and the run-time scope, scope items, a function category, and a business function, state, product, line of business, subject of insurance, transaction, and business function.

46. The non-transitory computer readable medium of claim 45, wherein the product structure scope comprises: a product description, a subject of insurance, coverage, sub-coverage, and line of business.

47. The non-transitory computer readable medium of claim 45, wherein the run-time scope comprises: a transaction, state/province, and a channel, wherein the channel is from a group comprising: agent, home office, direct, and call center.

48. The non-transitory computer readable medium of claim 43, wherein the field triggers comprise: a page load, and field exit.

49. The non-transitory computer readable medium of claim 42, wherein the behavior set properties include: enable/disable, required/not required, default value, visible/not visible, and editable/not editable.

50. The non-transitory computer readable medium of claim 43, wherein the field behaviors comprise: always, never, and by expression, wherein the visibility field behavior further comprises: by reflexive.

51. The non-transitory computer readable medium of claim 43, wherein the rule triggers comprise: save quote detail, and save claim action.

52. The non-transitory computer readable medium of claim 43, wherein the rule behaviors comprise: a knockout rule behavior, a hardstop rule behavior, a warning rule behavior, and an authorization rule behavior.

53. The non-transitory computer readable medium of claim 42, wherein the behavior set properties are selectable based on the behavior set scope.

54. The non-transitory computer readable medium of claim 42, wherein the behavior set properties further include values comprising: a unit of money indicator, a minimum value, and a maximum value.

55. A method for generating behavior sets services responsive to automated processes, the method comprising:

identifying a target object defined for multiple different target processes, for which to generate one or more behavior sets, including a first behavior set comprising a first behavior and a second behavior;

defining, in a behavior sets system, a first behavior set scope for the first behavior set for the target object, the first behavior set scope comprising definitions for behaviors for elements, fields, and rules in the multiple different target interfaces based on triggers for the elements, the fields, and the rules, wherein the triggers comprise field triggers and rule triggers and the field triggers are associated with a product structure scope and the rule triggers are associated with a runtime scope, and wherein the one or more behavior sets comprise outcomes that determine how the one or more behavior sets execute at application runtime;

determining whether the first behavior set scope matches at least a portion of an existing behavior set scope for the first behavior set for the target object or whether the first behavior set scope is an unique first behavior set for the target object, wherein:

when the first behavior set scope matches the at least the portion of the existing behavior set scope, defining in the behavior sets system a second behavior set scope for the first behavior set for the target object; and when the first behavior set scope is the unique first behavior set for the target object, defining in the behavior sets system the first behavior and the second behavior for the target object, by:

generating, using the behavior sets system, a behavior sets service comprising the one or more behavior sets, including the first behavior set, wherein the behavior sets service is independent of the multiple different target processes and accessible by the multiple different target processes, and provides the first behavior and the second behavior for the target object for use by the multiple different target processes; and communicating the behavior sets service to the multiple different target processes.

57. The method of claim 55, wherein the behavior sets service comprises the one or more behavior sets including the first behavior set and a second behavior set.

57. The method of claim 56, wherein the behavior sets, including the first behavior set and the second behavior set, comprise: behavior set details, a behavior set scope, and behavior set properties.

58. The method of claim 57, wherein the behavior set scope includes: the product structure scope, the run-time scope, scope items, a function category, a business function, state, product, line of business, subject of insurance, transaction, and business function.

59. The method of claim 55, wherein the multiple different target processes are automated processes without user interfaces.

* * * * *